(12) United States Patent
Kiss et al.

(10) Patent No.: US 7,910,679 B2
(45) Date of Patent: Mar. 22, 2011

(54) BULK HOMOGENEOUS POLYMERIZATION PROCESS FOR ETHYLENE PROPYLENE COPOLYMERS

(75) Inventors: Gabor Kiss, Hampton, NJ (US); Robert Patrick Reynolds, Jr., Clinton, NJ (US); John W. Chu, Neshanic Station, NJ (US); Steven P. Rucker, Warren, NJ (US); James Richardson Lattner, LaPorte, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 10 days.

(21) Appl. No.: 12/291,898

(22) Filed: Nov. 14, 2008

(65) Prior Publication Data

US 2009/0163678 A1 Jun. 25, 2009

Related U.S. Application Data

(60) Provisional application No. 61/008,489, filed on Dec. 20, 2007.

(51) Int. Cl.
*C08F 2/02* (2006.01)
*C08F 210/06* (2006.01)
*C08F 4/643* (2006.01)

(52) U.S. Cl. ......... 526/348; 526/64; 526/65; 526/348.3; 526/348.5; 526/348.6; 526/902

(58) Field of Classification Search ............ 526/89, 526/352, 64, 65, 348, 348.3, 348.5, 348.6, 526/902

See application file for complete search history.

(56) References Cited

U.S. PATENT DOCUMENTS

| | | | |
|---|---|---|---|
| 2,153,553 A | 4/1939 | Fawcett et al. |
| 2,852,501 A | 9/1958 | Richard, Jr. et al. |
| 3,294,772 A | 12/1966 | Cottle |
| 3,725,378 A | 4/1973 | Chamberlin |

(Continued)

FOREIGN PATENT DOCUMENTS

CA 2118711 3/1993

(Continued)

OTHER PUBLICATIONS

U.S. Appl. No. 11/961,583, filed Dec. 20, 2007, ExxonMobil.

(Continued)

*Primary Examiner* — Fred M Teskin
*Assistant Examiner* — Elizabeth Eng
(74) *Attorney, Agent, or Firm* — Robert A. Migliorini

(57) ABSTRACT

Provided are bulk homogeneous polymerization processes for producing ethylene propylene random copolymers. The process includes contacting in a reactor or in a series of reactors propylene monomer, ethylene comonomer with one or more catalyst systems and optional solvent (present at less than 40 wt %), wherein the reactor train is at a temperature of between 65° C. and 180° C. and at a pressure no lower than 10 MPa below the cloud point pressure of the polymerization system and less than 1500 MPa, and wherein the polymerization system for the reactor train is in its dense fluid state to form a polymer reactor effluent including a homogeneous fluid phase polymer-monomer mixture in the reactor train; and wherein the resultant copolymer product comprises between 10 wt % and 20 wt % randomly distributed ethylene and the concentration of total region defects in the continuous propylene segments of the random EP copolymer is between 40 and 150% greater than in a copolymer of equivalent melt flow rate and wt % ethylene polymerized by a solution polymerization process.

33 Claims, 2 Drawing Sheets

U.S. PATENT DOCUMENTS

| | | | |
|---|---|---|---|
| 4,135,044 A | 1/1979 | Beals | |
| 4,153,774 A | 5/1979 | Boettcher et al. | |
| 4,337,142 A | 6/1982 | Knudsen et al. | |
| 4,351,930 A * | 9/1982 | Patnaik | 526/125.6 |
| 4,530,914 A | 7/1985 | Ewen et al. | |
| 4,794,004 A | 12/1988 | Pfleger et al. | |
| 4,962,262 A | 10/1990 | Winter et al. | |
| 5,026,798 A | 6/1991 | Canich | |
| 5,081,322 A | 1/1992 | Winter et al. | |
| 5,084,534 A | 1/1992 | Wellborn, Jr. et al. | |
| 5,096,867 A | 3/1992 | Canich | |
| 5,236,998 A | 8/1993 | Lundeen et al. | |
| 5,272,236 A | 12/1993 | Lai et al. | |
| 5,324,799 A | 6/1994 | Yano et al. | |
| 5,324,800 A | 6/1994 | Wellborn, Jr. et al. | |
| 5,326,835 A | 7/1994 | Ahvenainen et al. | |
| 5,382,630 A | 1/1995 | Stehling et al. | |
| 5,382,631 A | 1/1995 | Stehling et al. | |
| 5,391,654 A | 2/1995 | Ahvenainen et al. | |
| 5,408,017 A | 4/1995 | Turner et al. | |
| 5,416,153 A | 5/1995 | Winter et al. | |
| 5,504,171 A | 4/1996 | Etherton et al. | |
| 5,514,761 A | 5/1996 | Etherton et al. | |
| 5,635,573 A | 6/1997 | Harrington et al. | |
| 5,652,308 A | 7/1997 | Merrill et al. | |
| 5,670,595 A | 9/1997 | Meka et al. | |
| 5,693,730 A | 12/1997 | Kuber et al. | |
| 5,723,560 A | 3/1998 | Canich | |
| 5,723,705 A | 3/1998 | Herrmann et al. | |
| 5,756,608 A | 5/1998 | Langhauser et al. | |
| 5,840,644 A | 11/1998 | Kuber et al. | |
| 5,866,663 A | 2/1999 | Brookhart et al. | |
| 5,882,750 A | 3/1999 | Mink et al. | |
| 5,936,053 A | 8/1999 | Fukuoka et al. | |
| 5,962,719 A | 10/1999 | Winter et al. | |
| 5,965,674 A | 10/1999 | Moen et al. | |
| 5,969,062 A | 10/1999 | Moll et al. | |
| 5,998,547 A | 12/1999 | Hohner | |
| 6,084,041 A | 7/2000 | Andtsjo et al. | |
| 6,124,231 A | 9/2000 | Fritze et al. | |
| 6,143,682 A | 11/2000 | Fisher | |
| 6,160,072 A | 12/2000 | Ewen | |
| 6,207,756 B1 | 3/2001 | Datta et al. | |
| 6,218,488 B1 | 4/2001 | Schiffino et al. | |
| 6,225,432 B1 | 5/2001 | Weng et al. | |
| 6,255,410 B1 | 7/2001 | Shigekauzu et al. | |
| 6,300,451 B1 | 10/2001 | Mehta et al. | |
| 6,355,741 B1 | 3/2002 | Marechal | |
| 6,372,847 B1 | 4/2002 | Wouters | |
| 6,469,188 B1 | 10/2002 | Miller et al. | |
| 6,492,473 B1 | 12/2002 | Canich | |
| 6,545,088 B1 | 4/2003 | Kolthammer et al. | |
| 6,562,914 B1 | 5/2003 | Andtsjo et al. | |
| 6,562,920 B2 | 5/2003 | Brant | |
| 6,642,316 B1 | 11/2003 | Datta et al. | |
| 6,689,847 B2 | 2/2004 | Mawson et al. | |
| 6,770,714 B2 | 8/2004 | Ommundsen et al. | |
| 6,881,800 B2 | 4/2005 | Friedersdorf | |
| 7,087,690 B2 | 8/2006 | Boussie et al. | |
| 7,163,989 B2 | 1/2007 | Friedersdorf | |
| 7,265,193 B2 | 9/2007 | Weng et al. | |
| 7,279,536 B2 | 10/2007 | Brant et al. | |
| 7,319,125 B2 | 1/2008 | Arjunan et al. | |
| 2001/0044506 A1 | 11/2001 | Mehta et al. | |
| 2002/0013440 A1 | 1/2002 | Argawal et al. | |
| 2002/0016415 A1 | 2/2002 | Laughner et al. | |
| 2002/0096797 A1 | 7/2002 | Stoffelsma et al. | |
| 2002/0176974 A1 | 11/2002 | Hanyu et al. | |
| 2003/0088021 A1 | 5/2003 | Van Dun et al. | |
| 2004/0024146 A1 | 2/2004 | Friedersdorf | |
| 2004/0110910 A1 | 6/2004 | Arjunan | |
| 2004/0122191 A1 | 6/2004 | Arjunan et al. | |
| 2004/0127654 A1 | 7/2004 | Brant et al. | |
| 2004/0138392 A1 | 7/2004 | Jiang et al. | |
| 2004/0158010 A1 | 8/2004 | Lehmus et al. | |
| 2004/0242734 A1 | 12/2004 | Lakeman et al. | |
| 2005/0042294 A1 | 2/2005 | Thanoo et al. | |
| 2005/0119184 A1 | 6/2005 | Khan et al. | |
| 2005/0228155 A1 | 10/2005 | Kawai et al. | |
| 2006/0009595 A1 | 1/2006 | Meka et al. | |
| 2006/0025545 A1 | 2/2006 | Brant et al. | |
| 2006/0096175 A1 | 5/2006 | Russell et al. | |
| 2006/0134221 A1 | 6/2006 | Geall | |
| 2006/0178491 A1 | 8/2006 | Canich | |
| 2006/0183861 A1 | 8/2006 | Harrington et al. | |
| 2006/0183881 A1 | 8/2006 | Ibar | |
| 2006/0211832 A1 | 9/2006 | Brant et al. | |
| 2006/0293474 A1 * | 12/2006 | Brant et al. | 526/134 |
| 2008/0090974 A1 | 4/2008 | Brant et al. | |
| 2008/0153997 A1 | 6/2008 | Casty et al. | |

FOREIGN PATENT DOCUMENTS

| | | |
|---|---|---|
| CA | 2103694 | 2/1994 |
| DE | 41 30 299 A1 | 3/1993 |
| EP | 0 480 190 B1 | 4/1992 |
| EP | 0 603 232 B1 | 9/1992 |
| EP | 0 667 359 | 8/1995 |
| EP | 0 718 324 | 6/1996 |
| EP | 0 806 436 | 11/1997 |
| EP | 0 846 696 A1 | 6/1998 |
| EP | 0 887 379 | 12/1998 |
| EP | 0 887 380 | 12/1998 |
| EP | 0 942 017 | 9/1999 |
| EP | 0 987 279 A1 | 3/2000 |
| EP | 0 129 368 B2 | 4/2002 |
| EP | 1 195 391 A1 | 4/2002 |
| EP | 1 231 226 | 8/2002 |
| EP | 1 008 607 B1 | 12/2003 |
| GB | 1443394 | 7/1976 |
| JP | 6-25357 | 2/1994 |
| JP | 9216916 A | 9/1997 |
| JP | 96-208535 | 2/1998 |
| JP | 10045834 | 2/1998 |
| JP | 342 1202 | 4/1998 |
| JP | 1998-110003 A | 4/1998 |
| JP | 1998176023 | 6/1998 |
| JP | 2001206914 | 7/2001 |
| WO | WO 88/04672 A1 | 6/1988 |
| WO | WO 92/14766 A1 | 9/1992 |
| WO | WO 93/05082 A1 | 6/1993 |
| WO | WO 93/11171 A1 | 6/1993 |
| WO | WO 94/00500 | 1/1994 |
| WO | WO 94/14856 A1 | 7/1994 |
| WO | WO 96/00246 A1 | 1/1996 |
| WO | WO 96/12744 A1 | 5/1996 |
| WO | WO 96/34023 A1 | 10/1996 |
| WO | WO 97/11098 A1 | 3/1997 |
| WO | WO 97/13790 A1 | 4/1997 |
| WO | WO 97/44391 | 11/1997 |
| WO | WO 97/45434 A1 | 12/1997 |
| WO | WO 97/48737 | 12/1997 |
| WO | WO 98/33823 A1 | 8/1998 |
| WO | WO 98/49229 | 11/1998 |
| WO | WO 99/02540 A1 | 1/1999 |
| WO | WO 99/11680 | 3/1999 |
| WO | WO 99/29749 A1 | 6/1999 |
| WO | WO 99/32226 A1 | 7/1999 |
| WO | WO 00/06621 | 2/2000 |
| WO | WO 00/12572 A1 | 3/2000 |
| WO | WO 00/37514 A1 | 6/2000 |
| WO | WO 00/40625 A1 | 7/2000 |
| WO | WO 00/50475 A1 | 8/2000 |
| WO | WO 00/64952 A2 | 11/2000 |
| WO | WO 01/44318 A1 | 6/2001 |
| WO | WO 01/46273 A1 | 6/2001 |
| WO | WO 02/34795 | 5/2002 |
| WO | WO 02/38628 A2 | 5/2002 |
| WO | WO 02/50145 A1 | 6/2002 |
| WO | WO 02/070572 A2 | 9/2002 |
| WO | WO 02/090399 A1 | 11/2002 |
| WO | WO 03/040095 A2 | 5/2003 |
| WO | WO 03/040201 A1 | 5/2003 |
| WO | WO 03/040202 | 5/2003 |
| WO | WO 03/040233 A2 | 5/2003 |
| WO | WO 03/040442 A1 | 5/2003 |
| WO | WO 2004/026921 | 4/2004 |
| WO | WO 2006/009976 A1 | 1/2006 |

| | | | |
|---|---|---|---|
| WO | WO 2006/009981 | | 1/2006 |
| WO | WO 2006/044149 | A1 | 4/2006 |
| WO | WO 2006/120177 | A2 | 11/2006 |
| WO | WO 2007/037944 | | 4/2007 |

OTHER PUBLICATIONS

U.S. Appl. No. 11/854,936, filed Sep. 13, 2007, ExxonMobil.
U.S. Appl. No. 12/002,509, filed Dec. 17, 2007, ExxonMobil Res & Eng.
Lehmus, P. et al., Abstract, "Metallocene-PP produced under supercritical polymerization conditions", and list of posters, 1$^{st}$ BlueSky Conference on Catalytic Olefin Polymerization, Jun. 17-20, 2002, Sorrento, Italy.
Lofgren et al., Abstract, Borealis Publications, "Metallocene-PP produced under supercritical conditions", 1$^{st}$ BlueSky Conference on Catalytic Olefin Polymerization, Jun. 17-20, 2002, Sorrento, Italy (2002).
Zowade et al., Abstract, PL 159518, "Manufacturing Low-molecular-weight Isotactic Polypropylene", Sep. 10, 1989.
Alt, H.G. et al., "Effect of the Nature of Metallocene Complexes of Group IV Metals on Their Performance in Catalytic Ethylene and Propylene Polymerization", Chem. Rev. 100, 2000, pp. 1205-1221.
Akimoto, A. et al., "New Developments in the Production of Metallocene LLDPE by High Pressure Polymerization", Tosoh Corp., Metallocene-Based Polyolefins 2000 (conference proceedings), pp. 287-308 (John Wiley & Sons Ltd.).
Barnhart, R. W. et al., "Synthesis of Branched Polyolefins Using a Combination of Homogeneous Metallocene Mimics", J. Am. Chem. Soc. 1998, vol. 120, pp. 1082-1083.
Bergemann, C. R. et al., "Copolymerization of Ethylene and 1,5-Hexadiene under High Pressure Catalyzed by a Metallocene", J. Mol. Catal. A: Chemical 116, 1997, pp. 317-322 (Elsevier).
Bergemann, C. R. et al., "Copolymerization of Ethylene and Linear α-Olefins with a Metallocene Catalyst System under High Pressure, Part II. Comparison of Propene, 1-Butene, 1-Hexene and 1-Decene", J. Mol. Catal. A: Chemical 105, 1996, pp. 87-91 (Elsevier).
Britovsek, G. J. P. et al., "The Search for New-Generation Olefin Polymerization Catalysts: Life Beyond Metallocenes", Chemie Intl. Edn., 1999, vol. 38, pp. 428-447.
Bujadoux, G. K., "Use of Bridged and Non-Bridged Metallocene Catalysts in High Pressure/High Temperature Ethylene/α-Olefin Copolymerization", Metallocenes 95 Intl. Congr., Metallocene Polym. 1995, pp. 375-402, Schotland Bus. Rsrch. Publ.
Chen, E. Y.-X, et al., "Cocatalysts for Metal-Catalyzed Olefin Polymerization: Activators, Activation Processes, and Structure-Activity Relationships", Chem. Rev. 2000, vol. 100, pp. 1391-1434.
Coates, G. W., "Precise Control of Polyolefin Stereochemistry Using Single Site Metal Catalysis", Chem. Rev. 100, 2000, pp. 1223-1252.
Cottom, W. P., "Waxes", in Encyclo. Chem. Tech., vol. 25, pp. 614-626, Fourth edition, 1998.
Eckstein, A. et al., "Determination of Plateau Moduli and Entanglement Molecular Weights of Isotactic, Syndiotactic, and Atactic Polypropylenes Synthesized with Metallocene Catalysts", Macromolecules 31, 1998, pp. 1335-1340.
Ewen, J. A. et al., "Syndiospecific Propylene Polymerizations with Group 4 Metallocenes", J. Am. Chem. Soc., 1988, vol. 110, pp. 6255-6256.
Gotz, C. et al., "MAO-Free Metallocene Based Catalysts in High Pressure Polymerisation of Ethylene and 1-Hexene", Chem. Eng. Technol., 21, 1998, pp. 954-957 (Wiley-VCH Verlag GmbH).
Hauptman, E. et al., "Stereoblock Polypropylene: Ligand Effects on the stereospecificity of 2-Arylindene Zirconocene Catalysts", J. Am. Chem. Soc. 1995, vol. 117, pp. 11586-11587.
Ittel, S. D. et al., "Late Metal Catalysts for Ethylene Homo- and Copolymerization", Chem. Rev. 2000, vol. 100, pp. 1169-1203.
Janiak, C., "Metallocene Catalysts for Olefin Polymerization", Metallocenes, Synthesis, Reactivity and Applications, vol. 2, Wiley-VCH, 1998, pp. 547-614, A. Togni and R. L. Halterman, editors.
Luft, G., "Development of Metallocene Catalysts and Their Application in the High Pressure Polymerisation Process" (Darmstadt University of Technology), PE 99, World Congress Global Technology Update Forum, Mar. 15, 16, 1999, Zurich, Switzerland.
Resconi, L. et al., "Selectivity in Propene Polymerization with Metallocene Catalysts", Chem. Rev. 2000, vol. 100, pp. 1253-1345.
Schaverien, C. J. et al., "Ethylene Bis(2-indenyl) Zirconocenes: A New Class of Diastereomeric Metallocenes for the (Co)Polymerization of α-Olefins", Organometallics 2001, vol. 20, No. 16, pp. 3436-3452 (ACI, Columbus, Ohio), Aug. 2001.
Scollard, J. D. et al., "Polymerization of α-Olefins by Chelating Diamide Complexes of Titanium", Macromolecules, 1996, vol. 29, p. 5241-5243.
Smith, B. D. et al., "Thermodynamic Data for Pure Compounds Part A, Hydrocarbons and Ketones Physical Sciences Data", vol. 25, Elsevier, New York, 1986, pp. 308-309.
Stephenson et al., "Handbook of the Thermodynamics of Organic Compounds", Elsevier Science Publ. NY, p. 75, 1987.
Stratton, A. W., "Waxes", in Encyclo. Polymer Science and Eng., vol. 17, pp. 784-795, Second Edition, 1985.
Suzuki, N. et al., "Olefin Polymerization Using Highly Congested Ansa-Metallocenes Under High Pressure: Formation of Superhigh Molecular Weight Polyolefins", Macromolecules, 2000, vol. 33, No. 3, pp. 754-759.
Yano., A. et al., "Homo- and Copolymerization of Ethylene at High Temperature with Cationic Zirconocene Catalysts", Macromol. Chem. Phys. 200, No. 4, pp. 917-923 (Wiley-VCH Verlag GmbH).
Yano, A. et al., Homo- and Copolymerization of Ethylene by Cationic Hafnocene Catalysts based on Tetrakis(pentafluorophenyl), Macromol. Chem. Phys. 200, No. 4, 1999, pp. 924-932 (Wiley-VCH Verlag Gmb).
Yano, A. et al., "Novel Zirconocene Catalysts for the Production of High Molecular Weight LLDPE in High Temperature Polymerization", Macromol. Chem. Phys. 200, No. 4, 1999, pp. 933-941 (Wiley-VCH Verlag GmbH).
Hackmann et al., "Functional Olefin Copolymers: Uniform Architectures of Propene/7-Methyl-1,6-Octadiene Copolymers by ATR-FTIR Spectroscopy Control of Monomer Composition", Macromolecules, American Chemical Society, Easton, US, vol. 33, No. 5, Mar. 7, 2000, pp. 1524-1529 (Germany).
Hackmann, M. et al., "Zirconocene-MAO Catalyzed Homo- and Copolymerizations of Linear Assymetrically Substituted Dienes with Propene: A Novel Strategy of Functional (co)poly(α-olefin)s", Macromol. Chem. Phys., pp. 1511-1517, 1998 (Germany).
Lee et al., "Copolymerizations of Olefins and Dienes with Homogeneous and Heterogeneous Catalysts", Eur. Polym. J., vol. 33(4), pp. 447-451, 1997 (Great Britain).
Dassaud, J. P. et al., "Copolymerization of Propene-Nonconjugated Dienes: Derivatization Through Hydroboration and Epoxydation", Polym. Adv. Technol., 4(7), pp. 457-464, 1993 (France).
Resconi, L. et al., "Effect of Monomer Concentration on Propene Polymerization with the rac-[Ethylenebis(1-indenyl)]zirconium Dichloride/Methylaluminoxane Catalyst", Macromol. 1995, 28, pp. 6667-6676.
Spalek, W. et al., "The Influence of Aromatic Substituents on the Polymerization Behavior of Bridged Zirconocene Catalysts", Organometallics 1994, 13, pp. 954-963.
Resconi, L. et al., "Highly Regiospecific Zirconocene Catalysts for the Isospecific Polymerization of Propene", J. Amer. Chem. Soc. 1998, 120, pp. 2308-2321.
Resconi, L. et al., "rac-[Methylene(3-tert-butyl-1-indenyl)$_2$]ZrCl$_2$: A Simple, High-Performance Zirconocene Catalyst for Isotactic Polypropene", Organometallics 2000, 19, pp. 420-429.
Kirby, C. F. et al., "Phase Behavior of Polymers in Supercritical Fluid Solvents", Chem. Rev. 1999, 99, pp. 565-602.
Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, vol. 204, pp. 1323-1337.
Seraidaris, T. et al., Copolymerization of Propane with Low Amounts of Ethene in Propene Bulk Phase, Polymer (2006), 47(1), 107-112.

* cited by examiner

Defects for a polymer chain segment growing from left to right 2,1-E 1,2  2,1  E  1,2

2,1-EE 1,2  2,1  E  E  1,2  1,2

2,1-P 1,2  2,1  1,2  1,2

BULK HOMOGENEOUS POLYMERIZATION PROCESS FOR ETHYLENE PROPYLENE COPOLYMERS

CROSS REFERENCE TO RELATED APPLICATION

This application claims the benefit of U.S. Provisional Application No. 61/008,489 filed Dec. 20, 2007, herein incorporated by reference in its entirety.

BACKGROUND

1. Field

The present disclosure relates to the field of olefin polymerization. It more particularly relates to ethylene-propylene copolymers and methods of producing them. Still more particularly, the present disclosure relates to ethylene-propylene random copolymers produced under bulk homogeneous polymerization conditions.

2. Description of the Related Art

Ethylene-propylene (EP) copolymers are typically made in a homogeneous solution type polymerization process. International Patent Publication No. WO 2006/044149, herein incorporated by reference in its entirety, discloses a polymerization process where the polymer dissolution is substantially aided by an inert solvent ("solution process"), such as where the polymerization medium contains more than 60 wt % solvent. The homogeneous solution type polymerization process typically utilizes greater than 60 wt % solvent typically comprising organic compounds of five or more carbon atoms to keep the product polymer in solution and thus to enable fouling-free reactor operations in the production of propylene-containing copolymers. With the accumulated inert propane in the monomer feed, the inert solvent/diluent level is often at or above 80 wt % in the polymerization reactor.

Because solution type processes operate with more than 60 wt % solvent plus the accumulated inerts present in the monomer feed, the monomer and comonomer concentration in the reactor feed is generally 20 wt % or less and is further reduced to less than 2.0 mol/L, or less than 1.0 mol/L, or even less than 0.5 mol/L due to monomer conversion in the polymerization reactor. This low monomer concentration has significant process cost consequences. For example, it reduces catalyst productivity necessitating relatively long residence times in the reactor (typically more than 15 minutes) with a corresponding large reactor volume. The lower monomer concentration also limits the EP copolymer product molecular weight at a given process temperature, which is generally compensated for by applying lower process temperatures (e.g., 35 to 90° C.) at the typical process pressure (typically 1.8 kpsi/124 bar or lower) of the reactor. In general, solution polymerization processes operate at less than 95° C., or less than 90° C., and at less than 2.0 kpsi (13.3 MPa=138 bar), or less than 1.8 kpsi (12.4 MPa=124 bar), or less than 1.5 kpsi (10.3 MPa=103 bar), or even less than 1.0 kpsi (6.9 MPa=69 bar). These low process temperatures in turn make the removal of polymerization heat costly, requiring large refrigeration trains that use a lot of energy and thus are expensive to install and to operate. The high energy usage ultimately also means increased green-house emissions.

As mentioned above, a substantial fraction of the production cost of the prior art solution polymerization process for producing EP copolymers is attributable to the expensive refrigeration systems necessitated by the low polymerization temperature. Another significant associated cost stems from the handling of the inert solvents required to keep the product polymer in solution, to absorb reaction heat, and to keep viscosity low. The handling and recycle of these inert solvents require large investment and substantially add to the operating cost. The solvent residues are also difficult and costly to remove from the product, but must be removed to avoid adversely affecting product quality, and raising environmental concerns related to solvent vapor release to the atmosphere. Consequently, processes enabling higher-temperature operations and/or eliminating the need for inert solvent would be advantageous.

Hence, there is a need for an improved polymerization process for EP copolymers enabling higher-temperature operations and/or eliminating the need for inert solvent/diluent compared to the prior art solution polymerization process for producing EP copolymers. There is also a need for EP copolymer products with improved microstructure and other properties, like, for example lower melt flow rate, compared to EP copolymers produced by the prior art solution polymerization process.

SUMMARY

Ethylene-propylene random copolymers produced by bulk homogeneous polymerization processes and methods for the production of such EP copolymers are provided.

According to the present disclosure, an advantageous continuous polymerization process to produce ethylene-propylene random copolymers comprises: (a) providing a reactor train including one reactor or two or more serially configured reactors; (b) contacting in the reactors of the reactor train 1) propylene monomer 2) one or more catalyst systems, 3) ethylene comonomer, and 4) optional one or more solvents, wherein the reactor train is at a temperature of between 65° C. and 180° C. and at a pressure no lower than 10 MPa below the cloud point pressure of the polymerization system and less than 1500 MPa, wherein the polymerization system for the reactor train is in its dense fluid state and comprises the propylene monomer, the ethylene comonomer, any solvent present, and the polymer product, wherein the one or more catalyst systems for the reactor train comprise one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof, wherein the polymerization system comprises less than 40 wt % of the optional solvent; and (c) forming a polymer reactor effluent including a homogeneous fluid phase polymer-monomer mixture in the reactor train; and wherein the resultant copolymer product comprises between 10 wt % and 20 wt % randomly distributed ethylene.

A further aspect of the present disclosure relates to advantageous random ethylene-propylene copolymers comprising: between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects in the propylene sequences of the copolymer is between 40 and 150% greater than in a copolymer of equivalent melt flow rate and wt % ethylene polymerized by a solution polymerization process.

These and other features and attributes of the disclosed EP copolymers, the bulk homogeneous polymerization processes to produce them, and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

Figure 1:
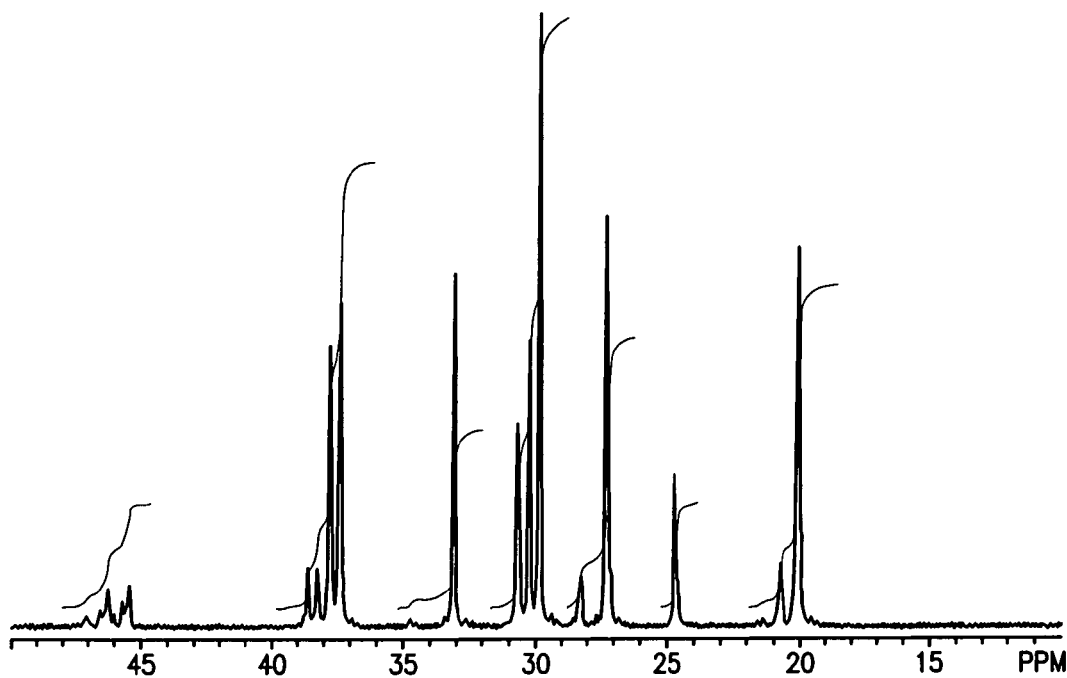
FIG. 1 depicts a typical $^{13}C$ NMR spectrum of an ethylene-propylene copolymer with high ethylene content.

For purposes of this disclosure and the claims thereto:

A catalyst system is defined to be the combination of one or more catalyst precursor compounds and one or more activators. Any part of the catalyst system can be optionally supported on solid particles, in which case the support is also part of the catalyst system.

Fluids are defined as materials in their liquid or supercritical fluid states. Dense fluids are defined as fluids in their liquid or supercritical states with densities greater than 300 kg/m$^3$.

Solid-fluid phase transition temperature is defined as the temperature at which a solid polymer phase separates from the polymer-containing polymerization system at a given pressure. The solid-fluid phase transition temperature can be determined by temperature reduction at constant pressure starting from temperatures at which the polymer is fully dissolved in the polymerization system. Solid-fluid phase transition temperature can be measured by turbidity in addition to other known measurement techniques.

Solid-fluid phase transition pressure is defined as the pressure at which a solid polymer phase separates from the polymer-containing polymerization system at a given temperature. The solid-fluid phase transition pressure can be determined by pressure reduction at constant temperature starting from pressures at which the polymer is fully dissolved in the polymerization system. Solid-fluid phase transition pressure can be measured by turbidity in addition to other known measurement techniques.

The cloud point is the pressure below which, at a given temperature, the polymer-containing polymerization system becomes turbid as described in J. Vladimir Oliveira, C. Dariva and J. C. Pinto, Ind. Eng, Chem. Res. 29, 2000, 4627. The cloud point can be measured by shining a helium laser through the selected polymerization system in a cloud point cell onto a photocell and recording the pressure at the onset of light scattering (turbidity) for a given temperature.

A higher α-olefin is defined as an alpha-olefin having four or more carbon atoms.

Use of the term "polymerization" encompasses any polymerization reaction such as homopolymerization and copolymerization. Copolymerization encompasses any polymerization reaction of two or more monomers.

The new numbering scheme for the Periodic Table Groups is used as published in Chemical and Engineering News, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade can include two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams. In a parallel reactor configuration, the reactor or reactors in series cascade that form a branch of the parallel reactor configuration is referred to as a reactor train.

A parallel reactor configuration includes two or more reactors or reactor trains connected in parallel. A reactor train, branch, or leg of the parallel configuration may include one reactor or more than one reactor configured in a series configuration. The entire parallel reactor configuration of the polymerization process disclosed herein, i.e., the combination of all parallel polymerization reactor trains forms the reactor bank.

Polymerization system is defined to be monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. By the current definition, the mixture present in the polymerization reactor and in its effluent is composed of the polymerization system plus the catalyst system. Dense fluid polymerization systems have greater than 300 kg/m$^3$ fluid phase density, all of their components listed above, i.e., the monomer(s) plus comonomer(s) plus polymer(s) plus optional inert solvent(s)/diluent(s) plus optional scavenger(s), are in fluid state, or stating differently, none of their components is in solid state. Note that these qualifications may be different for the catalyst system since it is not part of the polymerization system.

The polymerization system can form one single fluid phase or two fluid phases.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. In practical terms, a homogeneous polymerization system has all of its components in a single dense fluid phase. Apparently, a polymerization system is not homogeneous when it is partitioned to more than one fluid phases or to a fluid and a solid phase. The homogeneous fluid state of the polymerization system is represented by the single fluid region in its phase diagram.

A homogeneous polymerization process operates with a homogeneous polymerization system. Note that the catalyst system is not part of the polymerization system, thus it is not necessarily dissolved homogeneously in the polymerization system. A reactor in which a homogeneous polymerization process is carried out will be referred to as homogeneous polymerization reactor.

Pure substances, including all types of hydrocarbons, can exist in either a subcritical, or supercritical state, depending on their temperature and pressure. Substances in their supercritical state possess interesting physical and thermodynamic properties, which are exploited in this disclosure. In particular, as supercritical fluids undergo large changes in pressure, their density and solvency for polymers changes over a wide range. To be in the supercritical state, a substance must have a temperature above its critical temperature (Tc) and a pressure above its critical pressure (Pc). Mixtures of hydrocarbons, including mixtures of monomers, polymers, and optional solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current invention are those that found in the HANDBOOK OF CHEMISTRY AND PHYSICS, David R. Lide, Editor-in-Chief, 82nd edition 2001-2002, CRC Press, LLC. New York, 2001. In particular, the Tc and Pc of various molecules are:

| Name | Tc (K) | Pc (MPa) | Name | Tc (K) | Pc (MPa) |
|---|---|---|---|---|---|
| Hexane | 507.6 | 3.025 | Propane | 369.8 | 4.248 |
| Isobutane | 407.8 | 3.64 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By "continuous" it is meant a system that operates (or is intended to operate) without interruption or cessation. For example a continuous process to produce a polymer would be one where the reactants are continually introduced into one or more reactors and polymer product is continually withdrawn.

The term "high-boiling point diluent" refers to a hydrocarbon having a boiling point of 30° C. or more, or 50° C. or more, or 70° C. or more, or 100° C. or more, or 120° C. or more, or 150° C. or more than the boiling point of propylene (−47.6° C. at 760 mmHg). High-boiling diluents are also referred to as solvents herein. In olefin polymerization, solvents are typically hydrocarbons comprising five or more carbon atoms.

Solution polymerization refers to a polymerization process in which the polymer is dissolved in a liquid polymerization system comprising substantial amounts (typically 40 wt % or more, or 50 wt % or more, or 60 wt % or more) of solvent. Note that solution polymerization comprises a liquid polymerization system. Solution polymerization may be performed at conditions where a vapor and a liquid phase are present, in which case the polymerization system comprises the liquid phase.

Advantageously, solution polymerization is performed with liquid-filled reactors, in the substantial absence of a vapor phase. Liquid-filled reactor operations are characterized by reactor pressures that are at or advantageously above the bubble point of the polymerization system. Bubble point is defined as the pressure at which a liquid starts forming vapor bubbles at a given temperature. Bubble point pressures of hydrocarbon blends can be readily determined by standard techniques known in the art of chemical engineering. Methods suitable for conducting such calculations are equation of state methods, such as Peng Robinson or Suave Redlich Kwong. The bubble point of a liquid can be conveniently determined by reducing the pressure at constant temperature of a compressed fluid until the first vapor bubble is formed. Solution polymerization is typically performed in a single homogeneous liquid phase, but solution polymerization comprising two liquid phases are also known. In the latter case, the polymerization system is below of its cloud point pressure but above of its solid-fluid phase transition pressure and temperature. In these two-phase liquid polymerizations systems, the polymerization system is typically partitioned into two liquid phases, a polymer-lean and a polymer-rich liquid phase. In a well-stirred polymerization reactor, these two phases are finely dispersed. Note, however, that these two-phase liquid polymerizations systems have none of their components in solid state.

Supercritical polymerization refers to a polymerization process in which the polymerization system is in its dense supercritical or pseudo supercritical state, i.e. when the density of the polymerization system is above 300 g/L and its temperature and pressure are above the corresponding critical or pseudo critical values. Supercritical polymerization is typically performed in a single homogeneous supercritical phase, but supercritical polymerization comprising two supercritical fluid phases is also contemplated. In the latter case, the polymerization system is below of its cloud point pressure but above of its solid-fluid phase transition pressure and temperature. In these two-phase supercritical fluid polymerizations systems, the polymerization system is typically partitioned into two fluid phases, a polymer-lean and a polymer-rich fluid phase. In a well-stirred polymerization reactor, these two phases are finely dispersed. Note, however, that these two-phase supercritical fluid polymerizations systems have none of their components in solid state.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent or diluent. The product polymer may be dissolved in the dense fluid polymerization system or may form a solid phase. In this terminology, slurry polymerization, in which solid polymer particulates form in a dense fluid polymerization system containing less than 40 wt % of inert solvent or diluent, will be referred to as a bulk slurry polymerization process or bulk heterogeneous polymerization process. The polymerization process in which the polymeric product is dissolved in a single-phase dense fluid polymerization system containing less than 40 wt % of inert solvent or diluent will be referred to as bulk homogeneous polymerization process. The polymerization process in which the polymeric product is dissolved in a liquid polymerization system containing less than 40 wt %, or less than 30 wt %, or less than 20 wt %, or less than 10 wt %, or less than 5 wt %, or less than 1 wt % of inert solvent or diluent will be referred to as bulk solution polymerization process (as distinguished from other solution polymerization processes in which the polymeric product is dissolved in a liquid polymerization system containing greater than or equal to 40 wt % solvent, which is also referred to herein as the prior art solution process). The polymerization process in which the polymeric product is dissolved in a single-phase supercritical polymerization system containing less than 40 wt %, or less than 30 wt %, or less than 20 wt %, or less than 10 wt %, or less than 5 wt %, or less than 1 wt % of inert solvent or diluent will be referred to as bulk homogeneous supercritical polymerization process.

Homogeneous supercritical polymerization refers to a polymerization process in which the polymer is dissolved in a single-phase dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system. Note that by our definitions, the catalyst system should not be considered in determining whether a polymerization process is homogeneous or not.

Fouling refers to accumulation and deposition of solid polymer in the interior reactor volume and/or in its interconnected parts such as feed ports, stirrer (for stirred reactors), etc. For crystalline polymers, the polymer tends to accumulate and deposit on the reactor interior by crystallization on surfaces that are at or below the crystallization temperature of the polymer. Reactor fouling creates considerable operational costs, including reduced production rates and increased downtime for cleaning.

Reaction zone refers to the interior of a polymerization reactor where both the catalyst system and the polymerization system are present and mixed intentionally. The reaction zone is defined as the reactor interior filled with the mixed polymerization and catalyst systems between the feed ports and the effluent ports. By "where both the catalyst system and the polymerization system are present and mixed intentionally" we mean the space where the polymerization reaction is designed to take place and the polymer is designed to be present as opposed to spaces where no reaction is intended to happen and no polymer is intended to be present, such as the interior of the catalyst and monomer feed ports, stirrer assembly, etc. Although the later spaces are directly coupled to the reaction zone, no polymer is intended to enter and no polymer is intended to be polymerized in those spaces.

An ethylene propylene random copolymer (also referred to herein as EP copolymer, EP random copolymer and EP polyolefin elastomer) is defined as propylene-based polymer with random insertions of ethylene along the propylene-based polymer backbone. This is to be distinguished from ethylene propylene block copolymers which have groups or blocks of ethylene inserted along the propylene-based polymer backbone.

DETAILED DESCRIPTION

Provided are novel ethylene-propylene (EP) random copolymers and methods of producing such EP random copolymers utilizing bulk homogeneous polymerization processes. All numerical values within the detailed description and the claims herein are understood as modified by "about."

As discussed before, EP copolymers, particularly EP copolymers with ethylene contents of 10 wt % or higher, are typically made in solution polymerization processes that afford fouling-free operations. However, these solution polymerization processes for making such EP copolymers operate at low temperatures to achieve adequate molecular weights/melt flow rates, thus require expensive refrigeration trains. It has now been surprisingly discovered that such EP copolymers may be readily made using bulk homogeneous polymerization processes at substantially higher (15-30° C.) temperatures than required to make EP products with the same melt flow rate and ethylene content in solution processes. Advantageously, these novel processes operate essentially without inert solvents, thus the associated cooling and recycle investment and operating costs are significantly reduced. The lower operating cost is substantially derived from lower energy usage, which reduces greenhouse emissions from power generation, thus the disclosed bulk homogeneous polymerization processes for making said EP copolymers are also environmentally more benign than the prior art solution processes.

It has also been discovered that the EP random copolymer products made by the disclosed bulk homogeneous polymerization processes are differentiated from prior art EP copolymers in their microstructure. Namely, the EP copolymers disclosed herein have 40-150% higher total regio defect concentrations in their continuous propylene segments as measured by $^{13}C$ NMR than EP copolymers made by prior art solution polymerization processes. As disclosed by S. Datta et al. in the October 2003 issue of Rubber World (Vol. 229(1), p. 55), the stereoregularity of the propylene segments in EP copolymers affects the thermal (crystallization and melting) behavior of EP copolymers, which is an important attribute to their performance. The novel bulk homogeneous polymerization process for making EP copolymers disclosed herein also provides for operating cost advantages, and greater process flexibility.

U.S. patent application Ser. Nos. 11/433,889 and 11/177,004, herein incorporated by reference in their entirety, disclose a flexible homogeneous polymerization platform for the homogeneous supercritical polymerization of propylene-containing monomer feeds (also referred to herein as the "supercritical process", or "supercritical polymerization", or "supercritical polymerization process", or "supercritical propylene polymerization"). In the referred supercritical polymerization process, polymerization is often carried out in a substantially bulk supercritical monomer medium, which is referred to as a bulk homogeneous supercritical polymerization process. The polymeric products in these supercritical processes are in a homogeneously dissolved state in the reactor. Since supercritical fluids completely fill the volume available to them, the reactors of said supercritical polymerization processes are also completely filled with the supercritical fluid polymerization system, and thus in this regard are similar to the liquid-filled solution polymerization process.

Bulk Homogeneous Polymerization and Random EP Copolymer Overview

In one form of the present disclosure, provided is an advantageous continuous process to produce ethylene-propylene random copolymers that includes (a) providing a reactor train including one reactor or two or more serially configured reactors; (b) contacting in the reactors of the reactor train 1) propylene monomer 2) one or more catalyst systems, 3) ethylene comonomer, and 4) optional one or more solvents, wherein the reactor train is at a temperature of between 65° C. and 180° C. and at a pressure no lower than 10 MPa below the cloud point pressure of the polymerization system and less than 1500 MPa, wherein the polymerization system for the reactor train is in its dense fluid state and comprises the propylene monomer, the ethylene comonomer, any solvent present, and the polymer product, wherein the polymerization system comprises less than 40 wt % of the optional solvent, and (c) forming a polymer reactor effluent including a homogeneous, fluid phase polymer-monomer mixture in the reactor train; and wherein the resultant copolymer product comprises between 10 wt % and 20 wt % randomly distributed ethylene. The one or more catalyst systems for the reactor train comprise one or more catalyst precursors, one or more activators, and optionally, one or more catalyst supports. The one or more catalyst systems are chosen from Ziegler-Natta catalysts, metallocene catalysts, nonmetallocene metal-centered, heteroaryl ligand catalysts, late transition metal catalysts, and combinations thereof.

The one reactor or the two or more serially configured reactors (also referred to herein as a reactor train) in which the bulk homogenous polymerization process occurs may be chosen from tank type, loop type, tubular type and combinations thereof. When utilizing two or more serially configured reactors, a tubular reactor followed by a continuous stirred tank reactor or a tubular reactor followed by a loop reactor may be advantageous. In one form of the disclosed bulk polymerization processes for producing EP random copolymers disclosed herein, the reactor train operates above the critical or pseudo-critical temperature and critical or pseudo-critical pressure of the polymerization system.

In another embodiment, the disclosed bulk polymerization process for producing EP random copolymers may be carried out in two or more parallel reactor trains. In one form of this embodiment, each parallel reactor train may produce an EP random copolymer with differing molecular weights and/or compositions that may be subsequently in-line blended to form an EP random copolymer with a multi-modal molecular weight and/or composition distribution. In another form of this embodiment, one or more of the parallel reactor train may produce a propylene or ethylene based polymer, other than EP random copolymer, that again may be subsequently in-line blended to form a blend of an EP random copolymer and one or more other olefin based polymers. In still another form of this embodiment, two or more of the parallel reactor trains may produce an EP random copolymer with differing molecular weights and/or compositions and one or more of the parallel reactor trains may produce a propylene or ethylene based polymer, other than random EP copolymer. All of these parallel reactor trains may be in-line blended to form a multi-modal blend of EP random copolymer and one or more other olefin based polymers.

In another form, the disclosed bulk polymerization process for producing EP random copolymers operates at high monomer concentrations. Non-limiting exemplary monomer concentrations are greater than 2.0 mol/L, or greater than 2.5 mol/L, or greater than 3.0 mol/L, or greater than 5 mol/L, or greater than 10 mol/L in the polymerization reactor, or in its effluent. Some forms operate with substantially neat monomer feeds, i.e. a bulk homogeneous polymerization system. Such bulk monomer feeds may yield higher monomer concentrations in the reactor. Non-limiting exemplary monomer concentrations in the reactor are less than or equal to 12 mol/L, or less than or equal to 13 mol/L, or less than or equal to 14 mol/L, or less than or equal to 15 mol/L, or less than or equal to 16 mol/L, or less than or equal to 18 mol/L. Further details of bulk homogeneous polymerization systems are disclosed in U.S. Patent Application Nos. 60/876,193 and No. 60/905,247, herein incorporated by reference in their entirety.

Non-limiting exemplary process pressures utilized for making EP random copolymers using the bulk homogeneous polymerization process disclosed herein are from 2 to 40 kpsi (138-2759 bar), or 2 to 15 kpsi (138-1034 bar), or 2 to 20 kspi (138-1379 bar), or 3 to 15 kpsi (207-1034 bar), or 5 to 15 kpsi (345-1034 bar). Non-limiting exemplary lower pressure limits for making the EP random copolymers disclosed herein are 2, or 3, or 4, or 5, or 7, or 10 kpsi (138, 207, 276, 345, 483, or 690 bar, respectively). Non-limiting exemplary upper pressure limits for making EP random copolymers are 5, or 7, or 10, or 15, or 20, or 30, or 40 kpsi (345, 483, 690, 1379, 2069, or 2759 bar, respectively).

Non-limiting exemplary process temperature ranges for making the EP random copolymers disclosed herein are 65 to 180° C., or 65 to 140° C., or 70 to 180° C., or 75 to 150° C., or 80 to 150° C., or 80 to 140° C., or 90 to 135° C., or 100 to 130° C., or 110 to 125° C. Non-limiting exemplary lower temperature limits for making the EP random copolymers disclosed herein are 65, or 70, or 75, or 80, or 85, or 90, or 100, or 110° C. Non-limiting exemplary upper temperature limits for making the EP random copolymers disclosed herein are 180, or 160, or 150, or 140, or 135, or 130, or 125° C. Noteworthy is that the process temperature ranges of the bulk homogenous polymerization process for making EP random copolymers disclosed herein are significantly higher than the temperature ranges of the prior art solution processes, which typically do not exceed 90° C.

Non-limiting exemplary compositions on an ethylene/(ethylene+propylene) basis (i.e., pure monomer basis) in the feed to the reactor making the EP random copolymers disclosed herein range from 2 to 18 wt %, or 2 to 15 wt %, or 3 to 12 wt %, depending on the ethylene concentration of the desired EP copolymer product. Non-limiting exemplary compositions on an ethylene/(ethylene+propylene) basis, i.e., pure monomer basis in the effluent of the reactor making the EP random copolymers disclosed herein may range from 0.5 to 12 wt %, or 1 to 10 wt %, or 1 to 8 wt %, or 2 to 8 wt %, depending on the ethylene concentration of the desired EP copolymer product. Non-limiting exemplary propylene conversions in a single pass through the reactor making the EP random copolymers disclosed herein may range from 5 to 35%, or 5 to 30%, or 5 to 25%, or 7 to 25%, or 10 to 25%.

The ethylene conversion for a given feed composition and propylene conversion is governed by the ethylene/propylene reactivity ratio, defined as the ethylene/propylene molar ratio in the product divided by the ethylene/propylene molar ratio in the reactor. The ethylene/propylene reactivity ratio for the bulk homogeneous polymerization processes for producing EP random copolymers disclosed herein may range from 1.3 to 6, or 1.5 to 5, or 2 to 5, and may be determined by analyzing the monomer composition of the polymerization system and the product. The former can be accomplished by analyzing the reactor content or the reactor feed and effluent by standard gas chromatographic methods. The latter can be performed by using $^{13}C$ nuclear magnetic resonance ($^{13}C$ NMR) or infrared (IR) spectroscopy, as described later in the examples.

The bulk homogeneous polymerization processes for producing EP random copolymers disclosed herein produce one or more advantages relative to the prior art solution processes. For example, prior art solution processes typically utilize 60 wt % or more inert solvent to keep the product polymer in a homogeneous dissolved state, to absorb reaction heat, and to keep viscosity low. However, such high inert solvent concentrations utilized in solution processes lower the monomer concentration in the reactor to less than 2 mol/L, or less than 1.0 mol/L, or even less than 0.5 mol/L in the reactor and/or in its effluent. The lower monomer concentration in turn necessitates lowering the reactor temperature to deliver the desired product molecular weight required to achieve the desired melt flow rate related to melt viscosity. As mentioned before, maintaining lower reactor temperatures requires higher refrigeration capacity, which increases both the capital investment and the operation cost. In contrast, the disclosed bulk homogeneous polymerization processes for producing EP random copolymers operate with high monomer concentrations (combined propylene monomer and ethylene comonomer), for example, greater than 2.0 mol/L, or 2.5 mol/L, or 3.0 mol/L, or 5.0 mol/L, or 8.0 or 10.0 mol/L in the polymerization reactor, and/or in its effluent. The combined propylene monomer and ethylene comonomer present in the combined feed to the reactor may be 40, or 50, or 60, or 75 wt % or more. These higher monomer concentrations in the polymerization reactor enable the production of EP random copolymers at increased reactor temperatures allowing the reduction of capital investment and operation cost for the process.

The bulk homogeneous polymerization processes for producing EP random copolymers disclosed herein operate with a bulk homogeneous polymerization system, such as bulk solution polymerization and bulk homogeneous supercritical polymerization. These processes substantially utilize the monomer as a solvent in order to keep the polymer in a homogeneous dissolved state, to reduce viscosity, and to absorb the heat of reaction. For the bulk homogeneous polymerization processes for producing EP random copolymers disclosed herein, the reactor system may have monomer concentrations (propylene and ethylene) of less than or equal to 12 mol/L, or less than or equal to 13 mol/L, or less than or equal to 14 mol/L, or less than or equal to 15 mol/L, or less than or equal to 16 mol/L, or less than or equal to 18 mol/L. Small quantities of inert solvents/diluents may also be optionally present, but are advantageously a minority component in the reactor feed, and thus in the reactor. Hence, the total combined concentration of inert solvents for the bulk homogeneous polymerization processes for producing EP random copolymers disclosed herein is typically is less than 60%, or less than 50%, or less than 40%, or less than 30%, or less than 25%, or less than 20%, or less than 15%, or less than 10% on a weight basis.

Some inert solvent components having more than three carbon atoms may be added intentionally to the disclosed processes to function as solvent aids in small concentrations, but advantageously the disclosed processes use no such inert solvent in order to function as a solvent in the polymerization system. Inert solvents/diluents, however, may be present in the polymerization system disclosed herein due to build-up of inert components, like propane and ethane, present in the monomer feed. Such inert solvents/diluents may also originate from the catalyst feed solution. As it will be appreciated by those skilled in the art, these components are present in the polymerization system fortuitously, i.e., as an unavoidable component of a feed stream but not with the intent of using their polymer solvating properties in the reactor itself. Advantageously, the concentration of inert solvents having more than three carbon atoms typically used as solvents in the bulk homogeneous polymerization processes for producing EP random copolymers disclosed herein is less than 40 wt %, or less than 30 wt %, or less than 20 wt %, or 15 wt %, or less than 10 wt %, or less than 5 wt %, or less than 2 wt %, or less than 1 wt %, or less than 0.5 wt %, or less than 0.1 wt %, or less than 0.01 wt % (also defined as substantially free of inert solvent) in the combined reactor feed (i.e., the total of fresh and recycle feed), or in the polymerization system in the reactor, or in the polymerization system leaving the reactor. Advantageously, the disclosed bulk homogeneous polymerization processes for producing EP random copolymers disclosed herein operate in a polymerization system that is substantially free of inert solvents/diluents having more than three carbon atoms, thus operate without a dedicated solvent recycle and handling loop, which reduces plant capital investment and operating costs.

The higher monomer concentrations provided by the bulk homogeneous polymerization processes for producing EP random copolymers disclosed herein also advantageously provides for increased molecular weight of the EP random copolymer product at otherwise similar reactor conditions. In such embodiments, the reaction conditions are similar to those used in the prior art solution processes, but the products are of higher molecular weight affording lower melt flow rates while making EP copolymers with the same ethylene content.

In yet other embodiments, the disclosed bulk homogeneous polymerization processes for making random EP copolymers with 10-20 wt % ethylene content are operated at 15-30° C., or 20-30° C., or 25-30° C. higher polymerization temperatures than the prior art solution process for producing EP copolymers with the same ethylene concentration and melt flow rate (MFR). The higher operating temperature also creates a novel combination of ethylene concentration, melt flow rate, and polymer microstructure as determined by the total regio defect concentration measured by $^{13}$C NMR. The bulk homogeneous polymerization processes for producing EP random copolymers disclosed herein typically yield EP random copolymers with a 40-150% or 40-100% higher total regio defect concentration in the continuous propylene segments than the total regio defect concentration found in random EP copolymers of comparable ethylene content and melt flow rate made in prior art solution processes.

The combination of higher monomer concentration and higher operating temperatures provided by the disclosed bulk homogeneous polymerization processes, also provide significant increases in catalytic activity. In particular, catalytic activities for the disclosed bulk homogeneous polymerization processes, measured in turnover frequency (TOF), expressed as mole of monomers converted per mol catalytic metal per second, are 2-20 times, or 5-20 times, or 2-10 times or 3-10 times higher than prior art solution processes producing EP random copolymers with comparable ethylene concentration and melt flow rate. The higher catalytic activities of the disclosed bulk homogeneous polymerization processes in turn allows for smaller reactors, i.e., lower residence times, and/or lower catalyst concentrations and thus lower catalyst costs for making products with comparable ethylene concentration and melt flow rate. The optimum combination of reduction in reactor volume and/or reduction in catalyst usage may be determined by standard chemical engineering techniques.

Non-limiting exemplary reactor residence times for the disclosed bulk homogeneous polymerization processes are from 2 to 30 minutes, or 2 to 20 minutes, or 2-15 minutes, or 4-15 min, or 4-10 min. This reduced residence time also allows for a reduction in reactor size. Alternatively, or in combination thereof, the catalyst cost can be reduced by lowering the catalyst usage per unit polymer production with the disclosed bulk homogeneous polymerization processes.

In addition to propylene monomer and ethylene comonomer feeds to the reactor system, other comonomers may also be optionally fed to the reactors. Non-limiting exemplary optional comonomers include butene-1, pentene-1, hexene-1, octene-1, decene-1, dodecene-1, and combinations thereof. These optional comomomers may be incorporated into the EP copolymer product at from 0.5 to 10 mol %, or from 0.5 to 8 mol %, or 1 to 5 mol %. This allows for ethylene-propylene terpolymer products to be produced.

In another form of the present disclosure, provided are advantageous random ethylene-propylene copolymers comprising between 10 wt % and 20 wt % randomly distributed ethylene with a melt flow rate of between 0.5 and 20,000 g/10 min, wherein the copolymer is polymerized by a bulk homogeneous polymerization process, and wherein the total regio defects of the copolymer is between 40 and 150% greater than a copolymer of equivalent melt flow rate and wt % ethylene polymerized by a solution polymerization process.

The bulk homogeneous polymerization processes for producing EP random copolymers disclosed herein may produce copolymers with ethylene contents as measured by $^{13}$C NMR or IR methods (described in detail in the examples) ranging from 10 to 20 wt %, or 10 to 18 wt %, or 10 to 16 wt %. The bulk homogeneous polymerization processes for producing EP random copolymers disclosed herein may produce copolymers with melt flow rates as measured by ASTM D1238 or ISO 1133 methods ranging from 0.5 to 20,000 g/10 min, or 0.5 to 5,000 g/10 min, or 1.0 to 2,000 g/10 min, or 1.0 to 1,500 g/10 min. The total regio defect concentration in the continuous propylene segments of the EP random copolymers produced using the bulk homogeneous polymerization process disclosed herein may be greater than 0.50 mol %, or greater than 0.55 mol %, or greater than 0.60 mol %, or greater than 0.65 mol %, or greater than 0.70 mol %. The analytical method for measuring the regio defect concentration is by $^{13}$C NMR as described in the examples in detail. As previously described, the EP random copolymers disclosed herein have a total regio defect concentration in the continuous propylene segments which is 40-150% higher, or 40-100% higher than the total regio defect concentration of EP copolymers of comparable ethylene content and melt flow rate produced in prior art solution processes. When measurable amount of crystallinity is present in the random EP copolymers made by the disclosed processes, their melting peak temperature as measured by differential scanning calorimetry or DSC (for the details of the DSC method see examples) may range from 35 to 80° C., or 40 to 70° C., or 45 to 60° C. When an optional comonomer chosen from butene-1, pentene-1, hexene-1, octene-1, decene-1, dodecene-1 and combinations thereof is added to the reactor feed stream, a propylene-based random terpolymer product may be formed.

The remainder of the detailed description sets forth the details of the bulk homogenous polymerization processes (bulk homogeneous supercritical process and bulk solution process) where the processes and reactors previously described for producing the EP random copolymers disclosed herein are utilized. The advantageous processes for producing the EP random copolymers disclosed herein include reactors that operate with a bulk homogeneous dense fluid phase. Polymerization processes that operate in a homogenous dense fluid phase use either inert solvents or the monomers or their mixtures as a solvent in their liquid or supercritical state. Hence, the one or more reactors disclosed herein operate with polymerization systems in their homogeneous supercritical or in their liquid state. The bulk polymerization processes disclosed herein also operate with less than 40%, or less than 30%, or less than 20 wt % or less than 10 wt % or less than 5 wt % of inert solvent present in the reactor, and in some embodiments, with less than 1 wt % of inert solvent. In one embodiment of the disclosed process, the reactors operate at bulk homogeneous supercritical conditions as has been disclosed in U.S. patent application Ser. Nos. 11/433,889 and 11/177,004, herein incorporated by reference in their entirety.

Homogeneous Polymerization Process Details

In one or more embodiments, the process includes contacting, in a polymerization system, a propylene monomer, an ethylene comonomer with a catalyst, an activator, optional other comonomer (advantageously butene-1, hexene-1, or octene-1, or decene-1, or dodecene-1, or combinations thereof), and optionally inert solvent, at a temperature at or above 65° C., or 70° C., or 75° C., or 80° C., or 85° C., or 90° C., or 100° C., or 110° C., and at a pressure above 1.5 kpsi (103 bar), or above 2 kpsi (138 bar), or above 5 kpsi (345 bar), or above 10 kpsi (690 bar). The polymerization takes place in a bulk homogeneous polymerization system within the reactor.

In one or more embodiments, the density of the polymerization system is about 0.3 g/mL or more. In one or more embodiments, the density of the polymerization system is about 0.4 g/mL or more. In one or more embodiments, the density of the polymerization system is about 0.5 g/mL or more. In one or more embodiments, the density of the polymerization system is about 0.6 g/mL or more. In one or more embodiments, the density of the polymerization system is of from 0.3 g/mL to 0.75 g/mL or from 0.30 to 0.70 g/mL.

In one or more embodiments, the steady state polymer yield (i.e., conversion of monomer to polymer product) per pass is at least 5 wt % of the total combined monomer fed to the reactor. In one or more embodiments, the conversion of monomer to polymer product in a single pass is at least 10 wt % of the monomer. In one or more embodiments, the conversion of monomer to polymer product in a single pass is at least 20 wt % of the monomer. In one or more embodiments, the conversion of monomer to polymer product in a single pass is at least 30 wt % of the monomer. In one or more embodiments, the conversion of monomer to polymer product in a single pass is at least 40 wt % of the monomer. In one or more embodiments, the conversion of monomer to polymer product in a single pass is at least 50 wt % of the monomer. In one or more embodiments, the conversion of monomer to polymer product in a single pass is at least 60 wt % of the monomer. In one or more embodiments, the conversion of monomer to polymer product in a single pass is at least 70 wt % of the total combined monomer fed to the reactor.

In one or more embodiments, the polymerization conditions are sufficient to keep the polymer product dissolved in the monomers present in the liquid state (i.e., "bulk homogeneous solution polymerization"). In one or more embodiments, the polymerization conditions are sufficient to keep the polymer product dissolved in the monomers present in the dense supercritical fluid state (i.e., "bulk homogeneous supercritical polymerization"). In one or more embodiments, the polymerization conditions are sufficient to form a single homogeneous dense fluid polymerization system comprising the monomers and less than 40 wt % inert solvent (i.e., bulk homogeneous supercritical or bulk homogeneous solution polymerization). In one or more embodiments, the critical or pseudo-critical temperature and pressure of the reactor blends are different from the critical values of the pure components, and thus supercritical operations at temperatures lower than the critical temperature of one or more of the pure monomers (e.g., 92° C. for propylene) are possible. In one or more embodiments, near-amorphous materials with low melting points as well as amorphous materials can be produced without fouling even below the critical temperature of the reactor blends, i.e., at temperatures that correspond to the condensed liquid state of the polymerization system in the reactor. In these instances, the operating temperature can be below the bubble-point of the reaction mixture and thus the reactor can operate at what is often referred to as liquid-filled conditions. In some instances, such operation mode could be desired to achieve high molecular weight (MW) and thus low melt flow rate (MFR), particularly in the manufacture of the EP random copolymers disclosed herein.

In one or more embodiments, the reaction temperature and pressure can be selected so that the polymerization system remains at a pressure below the polymer's cloud point in the particular polymerization system, resulting in a two-phase polymerization system comprising a polymer-rich phase and a polymer-lean phase. Some embodiments that are below the polymer's cloud point nonetheless operate above the polymer's crystallization temperature.

In one or more embodiments, the polymerization temperature is above the cloud point of the polymerization system at the reactor pressure. More advantageously, the temperature is 2° C. or more above the cloud point of the polymerization system at the reactor pressure.

Non-limiting exemplary process temperature ranges for making the EP random copolymers disclosed herein are 65 to 180° C., or 65 to 140° C., or 70 to 180° C., or 75 to 150° C., or 80 to 150° C., or 80 to 140° C. or 90 to 135° C., or 100 to 130° C., or 110 to 125° C. Non-limiting exemplary lower temperature limits for making the EP random copolymers disclosed herein are 65, or 70, or 75, or 80, or 85, or 90° C., or 100° C., or 110° C. Non-limiting exemplary upper temperature limits for making the EP random copolymers disclosed herein are 180, or 160, or 150, or 140, or 135, or 130, or 125° C.

In another embodiment, the temperature is between 65 and 180° C., between 65 and 140° C., between 70 and 180° C., between 75 and 150° C., between 80 and 150° C., or between 80 and 140° C. In another embodiment, the temperature is at or above 65, or 70, or 75, or 80, or 85, or 90° C., or 100° C., or 110° C. In another embodiment, the temperature is at or below 180, or 160, or 150, or 140, or 135, or 130, or 125° C. In one or more embodiments, the polymerization temperature is from 65° C. to 180° C. In one or more embodiments, the polymerization temperature is about 70° C. to about 180° C. In one or more embodiments, the polymerization temperature is 75° C. to 150° C. In one or more embodiments, the polymerization temperature is about 40° C. to about 105° C. In one or more embodiments, the polymerization temperature is 80° C. to 150° C. In one or more embodiments, the polymerization temperature is 80° C. to 140° C.

In one or more embodiments, the polymerization temperature is above the fluid-solid phase transition temperature (sometimes referred to as crystallization temperature) of the polymerization system at the reactor pressure. Advantageously, the temperature is at least 2° C. or at least 5° C. above the fluid-solid phase transition temperature of the polymerization system at the reactor pressure. More advantageously, the temperature is at least 10° C. above the fluid-solid phase transformation point of the polymerization system at the reactor pressure.

In one or more embodiments, the polymerization pressure is above the fluid-fluid phase transition pressure of the polymerization system at the reactor temperature, i.e., the reactor operates with a homogeneous dense fluid polymerization system. In one or more embodiments, the polymerization pressure is no lower than 10 MPa (100 bar) below, or no lower than 5 MPa (50 bar) below, or no lower than 2 MPa (20 bar) below, or no lower than 1 MPa (10 bar) below, or no lower than 0.1 MPa (1 bar) below, or no lower than 0.01 MPa (0.1 bar) below the cloud point of the polymerization system at the reactor temperature.

Monomer and Comonomers:

Propylene monomer and ethylene comonomer are fed to the reactor(s) of the bulk homogeneous polymerization processes disclosed herein. The propylene monomer may have a purity of greater than 99 wt %, or greater than 99.5 wt % or greater than 99.9 wt %. The ethylene comonomer may have a purity of greater than 99 wt %, or greater than 99.5 wt % or greater than 99.9 wt %.

In one or more embodiments, one or more optional comonomers, in addition to the ethylene comonomer, may be fed to the reactor. For example, $C_4$ to $C_{12}$ aliphatic olefins, such as butenes, pentenes, hexenes, heptenes, octenes, nonenes, decenes, undecenes, and dodecenes, or aromatic-group-containing comonomers containing up to 30 carbon atoms can be used. Suitable aromatic-group-containing comonomers comprise at least one aromatic structure, advantageously from one to three aromatic structures, advantageously comprising a phenyl, indenyl, fluorenyl, or naphthyl moiety. The aromatic-group-containing comonomer further comprises at least one polymerizable double bond such that after polymerization, the aromatic structure will be pendant from the polymer backbone. The aromatic-group-containing comonomer can further be substituted with one or more hydrocarbyl groups including but not limited to $C_1$ to $C_{10}$ alkyl groups. Additionally two adjacent substitutions can be joined to form a ring structure. Advantageous aromatic-group-containing comonomers contain at least one aromatic structure appended to a polymerizable olefinic moiety. Particularly advantageous aromatic comonomers include styrene, alpha-methylstyrene, para-alkylstyrenes, vinyltoluenes, vinylnaphthalene, allyl benzene, and indene, especially styrene, paramethyl styrene, 4-phenyl-butene-1 and allylbenzene.

In one or more embodiments, non-aromatic cyclic group containing comonomers can be used. These comonomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing comonomers include vinylcyclohexane, vinylcyclohexene, vinylnorbornene, ethylidene norbornene, cyclopentadiene, cyclopentene, cyclohexene, cyclobutene, vinyladamantane and the like.

In one or more embodiments, diolefin comonomer(s) can be used. Advantageous diolefin comonomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene comonomers (i.e. di-vinyl monomers). More advantageously, the diolefin comonomers are linear di-vinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Polymer Product

In an advantageous embodiment, the process described can be used to produce random ethylene-propylene copolymer with an ethylene content ranging from 10 to 20 wt %. Advantageous polymers produced herein also include terpolymers of ethylene, propylene and one or more of the optional comonomers previously described. In another embodiment the polymer is a copolymer comprising propylene and ethylene, and the copolymer comprises less than or equal to 20 wt % ethylene, less than or equal to 18 wt % ethylene, less than or equal to 16 wt % ethylene, or less than or equal to 14 wt % ethylene, or less than or equal to 12 wt % ethylene. In another embodiment, the polymer is an ethylene-propylene random terpolymer comprising propylene and ethylene and one or more of any of the comonomers listed above.

In another embodiment, the polymer produced herein is a terpolymer of propylene, ethylene and one or more $C_2$ or $C_4$ to $C_{20}$ linear, branched or cyclic monomers, advantageously one or more $C_2$ or $C_4$ to $C_{12}$ linear, branched or cyclic alpha-olefins. Advantageously, the terpolymer produced herein is a terpolymer of propylene, ethylene and one or more of butene, pentene, hexene, heptene, octene, nonene, decene, undecene, dodecene, 4-methyl-pentene-1,3-methyl-pentene-1, and 3,5, 5-trimethyl hexene-1.

In another advantageous embodiment, the polymer produced herein can be a terpolymer of ethylene, propylene and one or more linear or branched $C_4$ to $C_{30}$ prochiral alpha-olefin or $C_5$ to $C_{30}$ ring-containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalysts.

In another embodiment, the copolymer comprises propylene present at from 70 to 90 wt %, or 80 to 90 wt %, or 82 to 90 wt %, and ethylene present at from 10 to 20 wt %, or 10 to 18 wt %, or 10 to 16 wt %, and an optional comonomer present at from 0.5 to 10 wt %, or from 0.5 to 8 wt %, or 1 to 5 wt %.

In another embodiment, the polymer produced when using two or more parallel reactor trains may be an EP random copolymer with a multimodal molecular weight and/or composition distribution. Alternatively, the polymer produced when using two or more parallel reactor trains may be blend of one or more EP random copolymer(s) and one or more propylene or ethylene based polymer, other than EP random copolymer.

Catalyst Systems

Any polymerization catalyst capable of polymerizing the monomers and comonomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Illustrative, but not limiting, olefin polymerization catalysts include Ziegler Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, N.Y., 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, the nonmetallocene metal-centered, heteroaryl ligand catalyst compounds are typically made fresh by mixing a catalyst precursor compound with one or more activators. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/177,004, the paragraphs of which are herein incorporated by reference.

The processes disclosed can employ mixtures of catalyst compounds to select the properties that are desired from the polymer. For example, mixed catalyst systems can control the molecular weight distribution of the product polymer when used with the disclosure processes or for the disclosure polymers. In one embodiment of the processes disclosed herein, the polymerization reaction(s) can be conducted with two or more catalyst compounds at the same time or in series. In particular, two different catalyst compounds can be activated with the same or different activators and introduced into the polymerization system at the same or different times. These systems can also, optionally, be used with diene incorporation to facilitate long chain branching using mixed catalyst systems and high levels of vinyl terminated polymers.

The process of the present disclosure can use one or more catalysts in any of the reactors of the polymerization reactor section. Any number of catalysts can be deployed in any of the reactors of the polymerization reactor section of the present disclosure. For practical reasons, no more than five catalysts are advantageous and no more than three catalysts are more advantageous in any given reactor. The process of the present disclosure can use the same or different catalysts or catalyst mixtures in the different individual reactors of the reactor section of the present disclosure.

The one or more catalysts deployed in the process of the present disclosure can be homogeneously dissolved in the polymerization system or can form a heterogeneous solid phase in the reactor. Operations with homogeneously dissolved catalyst systems are advantageous. When the catalyst system is present as a solid phase in the polymerization reactor, it can be supported or unsupported. The process of the present disclosure can use any combination of homogeneous and heterogeneous catalysts simultaneously present in one or more of the individual reactors of the polymerization reactor section, i.e., any reactor of the polymerization section of the present disclosure can contain one or more homogeneous catalysts and one or more heterogeneous catalysts simultaneously.

The process of the present disclosure can use any combination of homogeneous and heterogeneous catalysts deployed in the polymerization reactor section of the present disclosure. These combinations comprise scenarios when some or all reactors use a single catalyst and scenarios when some or all reactors use more than one catalyst. One or more catalysts deployed in the process of the present disclosure can be supported on particles using, for example, fumed silica as support, which either can be dispersed in the fluid polymerization system or can be contained in a stationary catalyst bed.

When the supported catalyst particles are dispersed in the polymerization system, they can be left in the polymeric product or can be separated from the product prior to its crystallization from the fluid reactor effluent in a separation step that is downstream of the polymerization reactor section. If the catalyst particles are recovered, they either can be discarded or can be recycled with or without regeneration. The catalyst can also be supported on structured supports, such as monoliths comprising straight or tortuous channels, reactor walls, internal tubing, etc. These structured supports are well known in the art of heterogeneous catalysis.

When the catalyst is supported, operation with dispersed or otherwise defined particles is advantageous. When the catalyst is supported on dispersed particles, operations without catalyst recovery are advantageous, i.e., the catalyst is left in the polymeric product of the process of the present disclosure. Unsupported catalysts dissolved in the polymerization system are most advantageous. The catalyst feed can be introduced any number of ways to the reactor. Advantageously, the catalyst feed is introduced separately from the monomer feed.

In addition, the one or more catalysts can be introduced through one or multiple ports to the reactor. If multiple ports are used for introducing the catalyst, those ports can be placed at essentially the same or at different positions along the length of the reactor. If multiple ports are used for introducing the catalyst, the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

Activators and Activation Methods for Catalyst Compounds:

The catalyst precursor compounds described herein are combined with activators for use herein. An activator is defined as any combination of reagents that increases the rate at which a catalyst precursor metal complex polymerizes unsaturated monomers, such as olefins. An activator can also affect the molecular weight, degree of branching, comonomer content, or other properties of the polymer.

A. Aluminoxane and Aluminum Alkyl Activators:

In one form, one or more aluminoxanes are utilized as an activator in the in-line blending processes disclosed herein. Aluminoxanes, sometimes called alumoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes can also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0561 476 A1, EP 0279586 B1, EP 0516476 A, EP 0594218 A1 and WO 94/10180.

When the activator is an aluminoxane (modified or unmodified), some embodiments select the maximum amount of activator at a 5000 fold molar excess Al/M, where M=the transition metal in the catalyst precursor compound, over the catalyst compound (per metal catalytic site). The minimum activator to catalyst compound is typically a 1:1 molar ratio.

B. Ionizing Activators:

It is contemplated to use an ionizing or stoichiometric activator, that is neutral or ionic, such as tri(n-butyl)ammonium tetrakis(pentafluorophenyl)-borate, a trisperfluorophenyl boron metalloid precursor or a trisperfluoro-naphtyl boron metalloid precursor, polyhalogenated heteroborane anions (WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include trisubstituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, naphthyl or mixtures thereof. Alternately, the three groups are halogenated, advantageously fluorinated, aryl groups. Alternately, the neutral stoichiometric activator is trisperfluorophenyl boron or trisperfluoronaphthyl boron.

Ionic stoichiometric activator compounds can contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

C. Non-Ionizing Activators:

Activators are typically strong Lewis-acids which can play either the role of ionizing or non-ionizing activator. Activators previously described as ionizing activators can also be used as non-ionizing activators. Abstraction of formal neutral ligands can be achieved with Lewis acids that display an affinity for the formal neutral ligands. These Lewis acids are typically unsaturated or weakly coordinated. Examples of non-ionizing activators include $R^{10}$ ($R^{11}$)3, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes. Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. In one or more embodiments, $R^{11}$ is an arene or a perfluorinated arene.

Other non-ionizing activators include $B(R^{12})_3$, where $R^{12}$ is an arene or a perfluorinated arene. Illustrative activators can include ionizing and non-ionizing activators based on perfluoroaryl borane and perfluoroaryl borates such as $PhNMe_2H+$ $B(C_6F_5)_4^-$, $(C_6H_5)_3C^+$ $B(C_6F_5)_4^-$, and $B(C_6F_5)^3$. Additional activators that can be used are described in WO 03/064433A1, which is incorporated by reference herein.

Supports

In another embodiment, the catalyst compositions of this disclosure include a support material or carrier. For example, the one or more catalyst components and/or one or more activators can be deposited on, contacted with, vaporized with, bonded to, or incorporated within, adsorbed or absorbed in, or on, one or more supports or carriers.

The support material is any of the conventional support materials. Advantageously, the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The advantageous support materials are inorganic oxides that include those Group 2, 3, 4, 5, 13 or 14 metal oxides. The advantageous supports include silica, which can or can not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. In addition, combinations of these support materials can be used, for example, silica-chromium, silica-alumina, silica-titania and the like. Additional support materials can include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is advantageous that the support material, most advantageously an inorganic oxide, has a surface area in the range of from about 10 to about 700 m²/g, pore volume in the range of from about 0 to about 4.0 mL/g and average particle size in the range of from about 0.02 to about 50 μm. More advantageously, the surface area of the support material is in the range of from about 50 to about 500 m²/g, pore volume of from about 0 to about 3.5 cc/g and average particle size of from about 0.02 to about 20 μm. Most advantageously the surface area of the support material is in the range is from about 100 to about 400 m²/g, pore volume from about 0 to about 3.0 mL/g and average particle size is from about 0.02 to about 10 μm.

Non-porous supports can also be used as supports in the processes described herein. For example, in an advantageous embodiment the nonporous, fumed silica supports described in U.S. Pat. No. 6,590,055 can be used.

Additional useful activators for use in the processes of this disclosure include clays that have been treated with acids (such as $H_2SO_4$) and then combined with metal alkyls (such as triethylaluminum) as described in U.S. Pat. No. 6,531,552 and EP 1 160 261 A1, which is incorporated by reference herein.

Scavengers

Compounds that destroy impurities without destroying the catalyst are referred to as scavengers by one skilled in the art of polymerization. Impurities can harm catalysts by reducing their activity. Scavengers can be optionally fed to the reactor(s) of the process disclosed herein. Catalytic activity can be defined many different ways. For example, catalytic activity can be expressed as turnover frequency, i.e., the number of moles of monomers converted to the product in a unit time by one mole of catalyst. For a given reactor operating at the same residence time, catalytic activity can also be measured in terms of catalyst productivity, customarily expressed as the weight of polymer made by a unit weight of catalyst.

The scavengers for use in the processes disclosed herein can be different chemical compound(s) from the catalyst activator. Non-limiting exemplary scavengers include alkyl aluminum compounds, such as trimethyl aluminum, triethyl aluminum, tri-isobutyl aluminum, and trioctyl aluminum. The scavenger can also be the same as the catalyst activator and is generally applied in excess of what is needed to fully activate the catalyst. These scavengers include, but are not limited to, aluminoxanes, such as methyl aluminoxane. The scavenger can also be introduced to the reactor with the monomer feed or with any other feed stream. In one particular embodiment, the scavenger is introduced with the monomer-containing feed. The scavenger can be homogeneously dissolved in the polymerization system or can form a separate solid phase. In one particular embodiment, scavengers are dissolved in the polymerization system.

Solvents

Advantageous inert solvents for use in the present disclosure include one or more of $C_4$ to $C_{24}$ alkanes, advantageously propane, n-butane, isobutane, n-pentane, isopentane, n-hexane, mixed hexanes, isohexane, cyclopentane, cyclohexane, etc., single-ring aromatics, such as toluene and xylenes. In some advantageous embodiments, the diluent comprises one or more of methane, ethane, propane, butane, isobutane, isopentane, and hexanes. In advantageous embodiments, the solvent/diluent is recyclable.

Advantageous diluents also include $C_4$ to $C_{150}$ isoparaffins, advantageously $C_4$ to $C_{100}$ isoparaffins, advantageously $C_4$ to $C_{25}$ isoparaffins, more advantageously $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins can also include cycloparaffins with branched side chains, generally as a minor component of the isoparaffin. Advantageously, the density (ASTM 4052, 15.6/ 15.6° C.) of these isoparaffins ranges from 0.65 to 0.83 g/mL; the pour point is −40° C. or less, advantageously −50° C. or less, the viscosity (ASTM 445, 25° C.) is from 0.5 to 20 cSt at 25° C.; and the average molecular weights in the range of 100 to 300 g/mol. Some suitable isoparaffins are commercially available under the trade name ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercially available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point range=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, advantageous diluents include $C_4$ to $C_{25}$ n-paraffins, advantageously $C_4$ to $C_{20}$ n-paraffins, advantageously $C_4$ to $C_{15}$ n-paraffins having less than 0.1%, advantageously less than 0.01% aromatics. Some suitable n-paraffins are commercially available under the trade name NORPAR (ExxonMobil Chemical Company, Houston Tex.), and are sold commercially as NORPAR series of n-paraffins. In another embodiment, advantageous diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, advantageously $C_5$ to $C_{18}$, advantageously $C_5$ to $C_{12}$. They contain very low levels of aromatic hydrocarbons, advantageously less than 0.1, advantageously less than 0.01 aromatics. Suitable dearomatized aliphatic hydrocarbons are commercially available under the trade name EXXSOL (ExxonMobil Chemical Company, Houston Tex.), and are sold commercially as EXXSOL series of dearomaticized aliphatic hydrocarbons.

In another embodiment the diluent comprises up to 20 wt % of oligomers of $C_6$ to $C_{14}$ olefins and/or oligomers of linear olefins having 6 to 14 carbon atoms, more advantageously 8 to 12 carbon atoms, more advantageously 10 carbon atoms having a kinematic viscosity of 10 or more (as measured by ASTM D 445); and advantageously having a viscosity index ("VI"), as determined by ASTM D-2270 of 100 or more.

In another embodiment, the diluent comprises up to 20 wt % of oligomers of $C_{20}$ to $C_{1500}$ paraffins, advantageously $C_{40}$ to $C_{1000}$ paraffins, advantageously $C_{50}$ to $C_{750}$ paraffins, advantageously $C_{50}$ to $C_{500}$ paraffins. In another embodiment, the diluent comprises up to 20 wt % of hydrofinished oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the trade names Synfluid™ available from ChevronPhillips Chemical Co. in Pasedena Texas, Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

In another embodiment, the diluent comprises a fluorinated hydrocarbon. Advantageous fluorocarbons for use in this disclosure include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Advantageous FC's include those represented by the formula: CxHyFz wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most advantageously from 1 to 3, wherein y is an integer greater than or equal to 0 and z is an integer and at least one, more advantageously, y and z are integers and at least one. For purposes of this disclosure and the claims thereto, the terms hydrofluorocarbon and fluorocarbon do not include chlorofluorocarbons.

With regard to the polymerization system, advantageous diluents and solvents are those that are soluble in and inert to the monomer and any other polymerization components at the polymerization temperatures and pressures used.

Polymerization Process Configuration

One or more reactors may be used. When more than one reactor is utilized, they may be arranged serially, in parallel or a combination thereof. The catalyst compound and activator can be delivered as a solution or slurry, either separately to the reactor, activated in-line just prior to the reactor, or preactivated and pumped as an activated solution or slurry to the reactor. An advantageous operation is two solutions, one for the catalyst and another one for the activator for in-line activated catalyst operation. Polymerizations in a reactor train may be carried out in either single reactor operation, in which monomer, comonomers, catalyst/activator, scavenger, and optional modifiers are added continuously to a single reactor or in series reactor operation, in which the above components are added to each of two or more reactors connected in series. The catalyst and other feed components can be added to the first reactor in the series only. Alternatively, some or all feed components can also be added to any of the reactors downstream of the first reactor in the reactor cascade. For example, one catalyst and/or monomer can be added to the first reactor, and another catalyst and/or monomer component can be added to other reactors.

Alternatively, a parallel reactor configuration may be utilized to carry out the polymerizations including two, three, four, five or more parallel reactor trains. Each parallel reactor train may include a single reactor or two or more serially connected reactors. A parallel reactor configuration may be advantageous for producing a multimodal molecular weight and/or composition distribution for the EP random copolymer, a blend of the EP random copolymer with another ethylene or propylene based polymer and a combination thereof.

The disclosed processes may produce single-reactor products or various blends of single-reactor products. Embodiments comprising more than one reactor may be configured in a single (series) reactor train or in a bank of parallel reactor trains. However, at least one of the reactors of the disclosed processes is always configured to make an ethylene-propylene random copolymer with the properties defined in the current disclosure.

In one or more embodiments, polymerization can occur in high-pressure reactors where, advantageously, the reactor is substantially unreactive with the polymerization reaction components and is able to withstand the high pressures and temperatures that occur during the polymerization reaction. Such reactors will be referred to as high-pressure reactors for purposes of this disclosure. Suitable reactors are selected from autoclave, pump-around loop or autoclave, tubular, and autoclave/tubular reactor combinations, among others.

Autoclave reactors can be operated in batch or continuous mode. To provide better productivity, and thus to lower production cost, continuous operation is advantageous in commercial operations. Tubular reactors always operate in continuous mode. Typically, autoclave reactors have length-to-diameter ratios of 1:1 to 20:1 and are fitted with a high-speed (up to 2000 RPM) multiblade stirrer. Commercial autoclave pressures are typically greater than 5 MPa with a maximum of typically less than 20 MPa, although smaller polymerization autoclaves are used commercially at significantly higher pressures (up to 200 MPa). The maximum pressure of large commercial autoclaves, however, can increase with advances in mechanical engineering and material science. When the autoclave has a low length-to-diameter ratio (such as less than four), the feed streams are typically injected at only one position along the length of the reactor. Reactors with large length-to-diameter ratios can have multiple injection ports at nearly the same position along the length of the reactor but radially distributed to allow for faster intermixing of the feed components with the polymerization system or for increasing or for decreasing the monomer concentration gradient in the reactor. Such configurations are well-known in the art of reactor engineering.

In the case of stirred tank reactors, the separate introduction of the catalyst is possible and often advantageous. Such introduction prevents the possible formation of hot spots in the unstirred feed zone between the mixing point and the stirred zone of the reactor. Injections at two or more positions along the length of the reactor are also possible and sometimes advantageous. For instance, in reactors where the length-to-diameter ratio is around 4-20, the reactor advantageously can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. A series reactor cascade consists of two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams.

Tubular reactors, advantageously capable of operating up to about 300 MPa, are also well suited for use in this disclosure. Advantageous tubular reactors are fitted with external cooling and one or more injection points along the (tubular) reaction zone. As in autoclaves, these injection points serve as entry points for monomers (such as propylene), one or more comonomer, catalyst, or mixtures of these. Advantageously, the flow regime in a tubular reactor is not laminar and the flow rates are high enough to exceed a Reynolds number value of 2000. When the Reynolds number exceeds 2000, the flow becomes increasingly turbulent. Typically, flows characterized by Reynolds number values of 4000 or more are completely turbulent. Flow turbulence facilitates the development of a "flat" fluid flow front with nearly identical flow rates and thus affords nearly identical residence time of reagents passing through the tube reactor. Turbulence also reduces heat transfer resistance thus affords better heat removal from and more even temperature profile in the reactor. The role of turbulence and its effects on residence time distribution, heat transfer, etc., are well known in the art of chemical engineering. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Advantageous tubular reactors can operate at pressures up to 300 MPa and advantageously have lengths of 100-4000 meters and internal diameters usually less than 12.5 cm thus sometimes have length/diameter ratios over 40,000.

Reactor trains that pair autoclaves with tubular reactors can also serve in disclosure processes. In such instances, the autoclave typically precedes the tubular reactor or the two types of reactors form separate trains of a parallel reactor configuration. Such systems can have injection of additional catalyst and/or feed components at several points in the autoclave and more particularly along the tube length.

In both autoclaves and tubular reactors, at injection, feeds are advantageously cooled to near ambient temperature or below to provide maximum cooling and thus maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously. A well-designed tubular reactor is characterized as plug flow. Plug flow is a flow pattern with minimal radial flow rate differences. In both multizone autoclaves and tubular reactors, catalyst can be injected at the inlet, and optionally at one or more points along the reactor. The catalyst feeds injected at the inlet and other injection points can be the same or different in terms of content, density, concentration, etc. Choosing different catalyst feeds allows polymer design tailoring.

In addition to autoclave reactors, tubular reactors, or a combination of these reactors, loop-type reactors are useful in this disclosure. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

Feed inlet temperatures are often near to or below ambient temperatures to provide cooling to the exothermic reaction in the reactor operating above the crystallization temperature of the polymer product.

The processes described herein can have residence times as short as 0.5 seconds and as long as an hour. In advantageous embodiments, the residence times are from 2 minutes to 30 minutes, advantageously from 2 to 20 minutes, or 3 to 15 minutes. In some embodiments, the residence time can be selected from 1, 5, 10, 15, 20, 25, 30 and 60 minutes. Practical maximum residence times can be selected from 2, 5, 10, 15, 20 and 30 minutes. In general, disclosure processes choose residence times of from 2 minutes to 20 minutes; more particularly 3 minutes to 15 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be advantageous. In addition, for practical reasons, for example for limiting the cost of monomer recycle, minimum conversions could be advantageous. Thus, the process can be run at practical conversion rates up to 80 percent or 60 percent, or 3-80, 5-80, 5-70, 10-70, 15-70, 20-70, 5-60, 10-60, 15-60, 20-60, 5-50, 10-50, 120-50, 5-50, 5-40, 10-40, 15-40, 20-40, or 5-30, 10-30, 15-30, 20-30 percent conversion, advantageously greater than 5, or greater than 10 percent conversion.

Comonomers, dual catalysts and polymer structure

In reactors with multiple injection points for catalyst and feed, there exists the possibility to tailor the polymer design. Use of more than one catalyst having different molecular weight and structural capabilities allows a wide variety of product compositions (e.g. bimodal, linear mixed with long chain branched). The various olefins will have differing reactivity ratios for a given catalyst so a plug flow operation will allow compositional tapering if for instance no feeds are injected down the reactor or compensation of the tapering if the more reactive monomer is injected preferentially along the tube. A single zone ideal back mixed autoclave reactor will not allow tapering of polymer composition but the use of multiple catalysts is still applicable. Operation of two such autoclaves in series or parallel can allow the use of tailoring by altering the composition of fresh feed to the second reactor.

When multiple series reactors are used, the production of polymer blends is possible. In one embodiment, EP random copolymers are made by using at least two reactors in series. In addition to ethylene, the optional copolymer could be butene-1,4-methylpentene-1, hexene-1, octene-1, styrene, norbornene, 1,5-hexadiene, and 1,7-octadiene. In a more advantageous embodiment, the copolymers are made from a two-component combination of ethylene with one of butene-1, hexene-1, styrene, norbornene, 1,5-hexadiene, and 1,7-octadiene. When the polymer blends are made in a series reactor cascade, one or more upstream reactors are fed with a single monomer-containing feed, while the feed of one or more downstream reactors is augmented with a comonomer feed stream.

When parallel reactor trains are used, the production of polymer blends is also possible. In one embodiment, EP random copolymers are made by using at least two parallel reactor trains. These two or more parallel reactor trains may produce EP random copolymers of differing molecular weights and/or compositions to produce an EP copolymer with a multimodal (bimodal or trimodal) molecular weight and/or composition distribution. In addition, one or more of the parallel reactor trains may produce an ethylene or propylene based polymer, other than a random EP copolymer, that may be in-line blended with the disclosed EP copolymer produced in at least one of the reactor trains of the parallel reactor bank. U.S. patent application Ser. No. 12/002,509 filed on Dec. 17, 2007, herein incorporated by reference in its entirety, discloses an improved in-line process for blending polymers to improve blend quality and reduce the capital and operating costs associated with blending, and may be utilized to produce the in-line blends from the parallel reactor trains disclosed herein.

Test Methods

Ethylene-propylene Copolymerization

Propylene Grade 2.5 (Airgas, Piscataway, N.J.) was obtained in #100 low pressure cylinders equipped with dip leg for liquid delivery to the monomer blending station. Ethylene Grade 4.5 (Airgas, Piscataway, N.J.) was obtained in high-pressure cylinders.

Custom blends containing ethylene and propylene were prepared in house. The monomer blend was fed to the reactor from the monomer blend vessel.

Gas samples were analyzed using a HP6890N (Agilent Technologies) gas chromatograph (GC) equipped with flame ionization detector (FID), gas sampling valve, and pressure control compensation. The analysis was performed with a 30 m 0.53 mm ID HP AL/M megabore capillary column (film thickness 15 micron). The carrier gas was helium. The temperature program started at 70° C., held initially for 3 min, ramped to 150° C. at 20° C./min. Total analysis time was 7 minutes. The data were acquired and processed by ChromPerfect software (Justice Laboratory Software). Calibration standards containing ethylene, propane and propylene were purchased from DCG Partnership, Pearland, Tex. The FID response factors were based on these calibration standards and were also checked against the results published by J. T. Scanlon, D. E. Willis in *J. Chrom. Sci.* 23 (1985) 333 and by W. A. Dietz in *J. Gas Chrom.* (1967) 68. For our mass balance calculations, propane, a trace impurity in the propylene feed (Air Gas), served as internal standard.

The monomer blend feed was purified using two separate beds in series: activated copper (reduced in flowing $H_2$ at 225° C. and 1 bar) for $O_2$ removal, and molecular sieve (5 Å, activated in flowing $N_2$ at 270° C.) for water removal. The flow rate and density of the feed were measured by a Coriolis mass flow meter (Model PROline promass 80, Endress and Hauser) that was located downstream of the purification traps on the low-pressure side of the feed pump. The purified monomer blend was fed by a diaphragm pump (Model MhS 600/11, ProMinent Orlita, Germany).

For effluent gas sampling, a laboratory gas pump (Senior Metal Bellows, Model MB-21) was used to continually remove a gas stream from the product collection vessel. This stream of reactor effluent was sent to the GC gas sampling port and through the GC sampling loop. The GC was programmed to acquire a new sample every 10 minutes during the run. The off-line feed and on-line effluent analysis results provided the compositional input for the mass balance calculations. The total feed mass flow was generated by summing the monomer feed flow rate measured by the mass-flow meter and the catalyst flow rate measured by the weight drop in the catalyst feed vessel.

Catalyst solutions were prepared in an Ar-filled glove box by using toluene stock solutions of the catalyst precursor and the activator, and were delivered to the reactor by a continuous high-pressure syringe pump (PDC Machines, Inc., Warminster, Pa.). The pump rate directly afforded the catalyst solution feed rate for the mass balances.

Material balances were calculated from two independent composition data sets. One of them relied on effluent gas analysis with propane internal standard. The other one was based on product yield and $^{13}C$ NMR and IR compositional analyses of the product polymer. The on-line analysis provided conversion, yield, and product composition data, therefore allowed to monitor and control those process parameters.

The Melt Flow Rate (MFR) was determined according to ASTM D1238 and ISO 1133 methods.

Heat flows during phase transitions were measured on heating and cooling the product samples from the solid state and melt, respectively, using Differential Scanning Calorimetry (DSC). Measurements were conducted using a TA Instrument MDSC 2920 or Q1000 Tzero-DSC and data analyzed using the standard analysis software by the vendor. Typically, 3 to 10 mg of polymer was encapsulated in an aluminum pan and loaded into the instrument at room temperature. Sample was cooled to either −130° C. or −70° C. and heated to 210° C. at a heating rate of 110° C./min to evaluate the glass transition and melting behavior for the as-received sample. The sample was held at 210° C. for 5 minutes to destroy its thermal history. Crystallization behavior was evaluated by cooling the sample from the melt to sub-ambient temperature at a cooling rate of 10° C./min. The sample was held at the low temperature for 10 minutes to fully equilibrate in the solid state and achieve a steady state. Second heating data was measured by heated this melt crystallized sample at 10° C./min. Second heating data thus provides phase behavior for samples crystallized under controlled thermal history conditions. The endothermic melting transition (first and second melt) and exothermic crystallization transition were analyzed for onset of transition and peak temperature. The melting temperatures reported in the tables are the peak melting temperatures from the second melt unless otherwise indicated. For polymers displaying multiple peaks, the higher melting peak temperature is reported. Glass transition reported is the temperature at which heat capacity change (ACp) is half its total value (step change between equilibrium liquid to equilibrium solid state) and at which half the sample has devitrified. Areas under the curve were used to determine the heat of fusion (Hf) which can be used to calculate the degree of crystallinity. A value of 8.7 kJ/mol was used as the equilibrium heat of fusion for 100% crystalline polypropylene (single crystal measurement) reported in B. Wunderlich, "Thermal Analysis", Academic Press, Page 418, 1990). The percent crystallinity is calculated using the formula, [area under the curve (Joules/gram)×42 (gram/mol)/8700 (Joules/mol]*100%.

Monomer Sequence Distribution and Composition by $^{13}$C NMR

Carbon NMR spectroscopy was used to measure monomer sequence distribution, composition, clustering, and regio defect concentrations in the propylene sequences. Carbon NMR spectra were acquired with a 10-mm broadband probe on a Varian UnityPlus 500 spectrometer. The samples were prepared in 1,1,2,2-tetrachloroethane-d$_2$ (TCE). Sample preparation (polymer dissolution) was performed at 140° C. In order to optimize chemical shift resolution, the samples were prepared without chromium acetylacetonate relaxation agent. Signal-to-noise was enhanced by acquiring the spectra with nuclear Overhauser enhancement for 10 seconds before the acquisition pulse. The 3.2 second acquisition period was followed by an additional delay of 4 seconds, for an aggregate pulse repetition delay of 17 seconds. Free induction decays of 3400-4400 coadded transients were acquired at a temperature of 120° C. After Fourier transformation (256K points and 0.3 Hz exponential line broadening), the spectrum is referenced by setting the upfield peak of the TCE to 74.054 ppm. FIG. 1 depicts a typical $^{13}$C NMR spectrum of a $C_2^=$-$C_3^=$ copolymer with high ethylene content.

The Journal of Applied Polymer Science article by Di Martino and Kelchtermans (*J. Applied Polymer Sci.* 56 (1995) 1781) provides an accessible tabulation of the chemical shift assignments for the peaks in the spectrum. The review article by Randall and Rucker (J. C. Randall and S. P. Rucker, *Macromolecules* 27(8) (1994) 2120) gives an overview of the procedure for converting the peak areas to the monomer sequence triads that define the chain microstructure. The measured integrals are converted into monomer triad and chain defect concentrations through a linear algebraic matrix system y=Ax which relates the two. The matrix system employs the integrals as the dependent y vector, the triad/defect concentrations as the x vector, and the number of carbons (intensity) contributed by each triad or defect structure to each integral region as the transfer matrix, A. The nomenclature adopted for the analysis is tabulated below:

| Chemical shift range (ppm) | NMR region | Chain structure |
|---|---|---|
| 45-48 | A | PPP + ½PPE |
| 43-43.8 | 2,1-P | 2,1-Pt |
| 41-42 | 2,1-P | 2,1-Pe |
| 37-39 | B | PEP + (½)PEE + EPE + (½)PPE |
| 38.4-38.95 | 2,1-P | 2,1-Pe + 2,1-Pt |
| 35.2-36 | 2,1-P | 2,1-Pe + 2,1-Pt |
| 34-35.7 | 2,1-E + 2,1-P | 2,1-E + 2,1-EE + 2,1-Pt |
| 33.8, 33.9 | 2,1-E | 2,1-E |
| 33.4, 33.55 | 2,1-EE | 2,1-EE |
| 32.9-33.4 | C | EPE |
| 32-32.5 | 2,1-P | 2,1-Pt |
| 31.1-31.25 | 2,1E + 2,1-EE | 2,1-E, 2,1-EE |
| 30.5-31.05 | D | EPP + 2,1-Pt + 2,1-Pe |
| 30.6-30.7 | Γγ | PEEP |
| 30.2-30.3 | γδ$^+$ | PEEE + 2,1-Pe |
| 29.8-30 | δ$^+$δ$^+$ | (EEE)n |
| 27.8-29 | F | PPP |
| 27.5-27.9 | Bγ | 2,1-E-E |
| 27.25-27.45 | G1 | PEE |
| 26.9-27.25 | G2 | PEE |
| 24.2-24.9 | H | PEP |
| 21.2-22.3 | I1 | PPPmm |
| 20.5-21.2 | I2 | PPPmr + PPE |
| 19.76-20.3 | I3 | PPPrr + EPE |
| 15.0 | 2,1-P-t | 2,1-P-t |
| 15.4 | 2,1-P-t | 2,1-P-t |
| 17.2 | 2,1-P-e | 2,1-P-e |
| 17.5 | 2,1-P-e | 2,1-P-e |

The ethylene and propylene triad concentrations are normalized to 100%. The mole-percent ethylene will then be the sum of the ethylene-centered triads, and mole-percent propylene will be the sum of the propylene-centered triads. The defect concentrations can be cast in terms of mol % defects, i.e. defects per 100 triads.

The distribution of monomers in the chain can be modeled with a statistical model for the polymerization. The simplest, Bernoullian, model assumes that comonomers add to the growing chain without bias from the monomer currently at the chain terminus. The next-higher order model, the first-order Markovian, assumes that the monomer is sensitive to the current chain-end monomer during the addition reaction. This allows the mathematical description of a reaction system's propensity for making alternating, random, and block copolymers. The Markovian analysis of finite EP polymer chains by Randall and Rucker (J. C. Randall and S. P. Rucker, *Macromolecules* 27(8) (1994) 2120) explains the mathematics behind the statistical modeling of the polymer microstructure, and is excerpted in part here.

There are four basic first-order Markov transition probabilites for the four possible adjoining pairs of monomer units In a Markov diad, the first unit is called the initial state and the second unit is called the final state. With the exception of the end groups, a diad description requires that each unit in a copolymer chain serves as both an initial state and a final state. For a copolymer chain, there are only two possibilities for the initial state and, likewise, only two possibilites for the final state. The statistical treatment that follow will be derived for a poly(ethylene-co-propylene), but they apply to any copolymer chain.

Probability designations for ethylene-propylene copolymerization

| Initial State | Add | Final state | Transition probability |
|---|---|---|---|
| E | E | E | $P_{EE}$ |
| E | P | P | $P_{EP}$ |
| P | E | E | $P_{PE}$ |
| P | P | P | $P_{PP}$ |

Accordingly, the four transition probabilities outlined in the table above must be related as follows:

$$P_{EE} + P_{EP} = 1$$

$$P_{PE} + P_{PP} = 1$$

A first order Markovian system reduces to Bernoullian when $$P_{EE} = P_{PE} = P_E = \text{mole fraction of "E"}, \text{ and}$$

$$P_{EP} = P_{PP} = P_P = \text{mole fraction of "P"},$$

which demonstrates that chain propagation for Bernoullian copolymer systems is independent of the identity of the initial state. Consequently, Bernoullian statistical analyses are defined with only one independent variable and first order Markov analyses are defined with two independent variables. The process for deriving the transition probabilities from the triad concentrations is described comprehensively in the work of Randall and Rucker (J. C. Randall and S. P. Rucker, *Macromolecules* 27(8) (1994) 2120). A sequence of any length in a copolymer chain can now be defined in terms of only two transition probabilities.

Calculating the transition probabilities has utility not only for calculating the predicted concentration of any arbitrary sequence of monomers in the chain, but also for characterizing the propensity of the monomers to cluster in the chain. One such method for characterizing the tendency of comonomers to polymerize in a non-random fashion is the cluster index developed by Randall (J. C. Randall, "A Review of High Resolution Liquid $^{13}$-Carbon Nuclear Magnetic Resonance Characterizations of Ethylene-Based Polymers", *JMS-Rev. Macromol. Chem. Phys.* (1989), C29(2 & 3), pp 201-317). This measures the deviation in the concentration of isolated comonomer triads (EPE triads) from that predicted by a Bernoullian model:

$$\text{Cluster index} = 10 \cdot \left[1 - \frac{[EPE]_{observed} - [EPE]_{random}}{[P]_{observed} - [EPE]_{random}}\right]$$

which can be restated in terms of the monomer triads:

$$\text{Cluster index} = 10 \cdot \left[1 - \frac{[EPE]_{observed} - [EPE]_{random}}{[PPP]_{observed} + [PPE + EPP]_{observed} + [EPE]_{observed} - [EPE]_{random}}\right]$$

In a polymer of 50 mol % ethylene, for example, an alternating architecture will have all the P comonomer in one-monomer blocks. Thus $[EPE]_{observed} = [P]_{observed}$, and the cluster index becomes 0. A random copolymer will have $[EPE]_{observed} = [EPE]_{random}$, giving a cluster index of 10. In the case of a block copolymer, the fraction in the brackets becomes −0.33, and the cluster index 13.3. This is summarized in the table below:

| Microstructure | Cluster index for 50/50 copolymer |
|---|---|
| Alternating | 0 |
| Random | 10 |
| Block | 13.3 |

Another pair of common descriptors for the polymerization process are the reactivity ratios, $R_E$ and $R_P$, which can be expressed as rate of homopolymerization divided by the rate of copolymerization, multiplied or divided by the ratio [E]/[P].

$$R_E = \frac{k_{EE}}{K_{EP}} = \frac{P_{EE}[P]}{P_{EP}[E]}$$

$$R_P = \frac{k_{PP}}{k_{PE}} = \frac{P_{PP}[E]}{P_{PE}[E]}$$

Calculating these reactivity ratios from the NMR data would require information about the monomer ratios in the reactor, [E]/[P], which often are not available. Multiplying these quantities $R_E$ and $R_P$, we can remove the monomer ratio dependence:

$$R_E R_P = \frac{P_{EE} P_{PP}}{P_{EP} P_{PE}}$$

In principle, this product can be determined from any polymer analytical technique that yields a triad distribution and also from kinetics experiments. The important result of this calculation is that there are certain values for the transition probabilities that provide break points for describing blocky, alternating, or random polymers, and these are tabulated below.

| Transition probabilities | $R_E R_P$ | Polymer structure |
|---|---|---|
| $P_{EE} = 1 \; P_{EP} = 0$<br>$P_{PP} = 1 \; P_{PE} = 0$ | ∞ | blocky |
| $P_{EE} = .5 \; P_{EP} = .5$<br>$P_{PP} = .5 \; P_{PE} = .5$ | 1 | random |
| $P_{EE} = 0 \; P_{EP} = 1$<br>$P_{PP} = 0 \; P_{PE} = 1$ | 0 | perfectly alternating |

Figure 2:
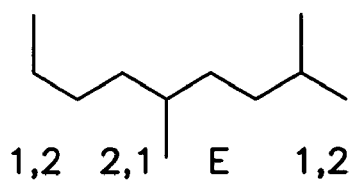
FIG. 2 depicts the defects for a polymer chain segment growing from left to right.
Figure 2:
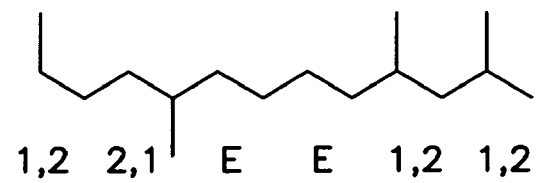
Figure 2:
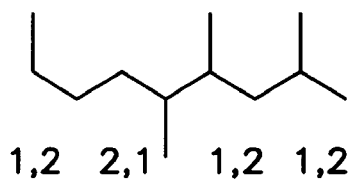

Several regio defects were assigned and integrated in the NMR spectrum where observed. These result from reverse (2,1) addition of the propylene monomer, followed by either a propylene, one ethylene, or two ethylenes, and are designated 2,1-P, 2,1-E, and 2,1-EE, respectively. Peak assignments for these defects can be found in the work of Cheng. (H. N. Cheng, "$^{13}$C NMR Analysis of Ethylene-Propylene Rubbers", *Macromolecules*, 17, 1950-1955, (1984)). The defects are illustrated in FIG. 2 for a polymer chain segment growing from left to right.

The quantification of the regio defect concentrations can be performed by integrating representative spectral region(s) for each defect, and comparing that (average) integral against the total monomer triad count, as determined from the linear algebraic solution described above.

For the materials considered here, we used the 33.8-33.9 ppm region to quantify 2,1-E defects, and the 33.4-33.55 region to quantify the 2,1-EE defect. The 2,1-P defects when present give characteristic (and well-resolved) peaks in the 15-17.5 ppm region). These are further resolved into contributions from erythro (2,1-Pe) and threo (2,1-Pt) stereochemistry at the defect site.

Ethylene Concentration by Infrared Spectroscopy (IR)

Ethylene analyses of ethylene-propylene copolymers by IR were performed using thin polymer films of the product EP copolymers. The calibration standards and test films were prepared according to sub-method A of ASTM D3900. The calibration correlated the area ratio of the peaks at 1155 and 722 cm$^{-1}$, and was fitted by the following expression for products with ethylene contents of less than 40 wt %:

$$\text{Ethylene wt \%} = 72.698 - 86.495X + 13.696X^2$$

where $X$=(peak area at 1155 cm$^{-1}$)/(peak area at 722 cm$^{-1}$). The $^{13}$C NMR and IR analysis results showed good agreements and the IR and NMR results were typically within 1 wt %.

EXAMPLES

Tables 1 and 2 below provide examples for process conditions applied and product compositions obtained by processes of the current disclosure.

TABLE 1

Exemplary process conditions for producing ethylene-propylene random copolymers of about 20 g/10 min MFR and 14-15 wt % ethylene content by disclosure processes

| Process/Product Variable | Unit | Sample number | | | | |
|---|---|---|---|---|---|---|
| | | 25230- | | 25231- | | |
| | | 124 | 149 | 059 | 087 | Average |
| Reactor temperature | deg C. | 105 | 106 | 106 | 104 | 105 |
| Reactor pressure | psi | 10278 | 10436 | 10467 | 10190 | 10343 |
| Feed ethylene (E/(E + P)) | wt % | 7.2 | 7.1 | 6.6 | 6.3 | 6.8 |
| Propylene conversion | % | 19 | 20 | 19.2 | 19 | 19 |
| Ethylene conversion | % | 41 | 46 | 48.5 | 47 | 46 |
| Reactor ethylene (E/(E + P)) | wt % | 4.4 | 4.2 | 3.7 | 3.8 | 4.0 |
| Product ethylene | wt % | 14.3 | 15.1 | 15.1 | 14.4 | 14.7 |
| Inert solvent/diluent | wt % | 5.6 | 3.9 | 5.4 | 6.1 | 5.3 |
| Residence time | min | 5.0 | 5.0 | 5.5 | 5.4 | 5.2 |
| Ethylene incorporation ratio | (Prod. E/P)/(rxn E/P) | 3.6 | 4.1 | 4.6 | 4.3 | 4.1 |
| MFR | g/10 min | 19 | 19 | 21 | 18 | 19 |
| Mw | kg/mol | 130 | 123 | 125.6 | 131 | 127 |
| Mn | kg/mol | 64 | 61 | 61.9 | 66 | 63 |

TABLE 2

Exemplary process conditions for producing ethylene-propylene random copolymers of about 9-16 g/10 min MFR and 11-12 wt % ethylene content by disclosure processes

| Process/Product Variable | Unit | Sample # 25231- | |
|---|---|---|---|
| | | 111 | 116 |
| Reactor temperature | deg C. | 97 | 96 |
| Reactor pressure | psig | 10285 | 10805 |
| Feed ethylene (E/(E + P)) | wt % | 5.2 | 4.9 |
| Propylene conversion | % | 14.2 | 17.9 |
| Ethylene conversion | % | 35.5 | 43.2 |
| Reactor ethylene (E/(E + P)) | wt % | 3.6 | 3.1 |
| Product ethylene | wt % | 11.9 | 11.1 |
| Inert solvent/diluent | wt % | 6.9 | 4.9 |
| Residence time | min | 5.1 | 5.1 |
| Ethylene incorporation ratio | (Prod. E/P)/(rxn E/P) | 3.6 | 3.9 |
| MFR | g/10 min | 16 | 9 |
| Mw | kg/mol | 150 | 167 |
| Mn | kg/mol | 74 | 84 |

The products obtained by the bulk homogeneous process disclosed herein were compared with a comparative product made with the same catalyst via a solution polymerization process (designated COM1). The catalyst precursor used was dimethyl (1-dimethylsilyl)bis(indenyl)hafnium and the catalyst activator used was dimethylaniliniumtetrakis(heptafluoronaphthyl)borate. The comparative COM1 product and the products made by the inventive process disclosed herein were selected to have the same MFR and ethylene content. The microstructural differences between COM1 made by the comparative solution process and products of similar (15 wt %) ethylene concentration and MFR (about 20 g/min) made by the inventive processes disclosed herein (designated samples 25230-124 and 25230-149) are illustrated in Table 3 below.

TABLE 3

A comparison of the microstructure and randomness of prior art
and current disclosure ethylene-propylene copolymer products of ~15 wt %
ethylene and ~20 g/10 mn MFR

| Sample # | Ethylene content | | Propylene sequence regio defects | | | | Monomer sequence distribution | | | | | | Cluster Index | $R_E \cdot R_P$ |
|---|---|---|---|---|---|---|---|---|---|---|---|---|---|---|
| | by NMR | | Total | 2,1-E | 2,1-EE | 2,1-P | EEE | EEP | PEP | EPE | PPE | PPP | | |
| | wt % | mol % | mol % | | | | mol fraction | | | | | | | |
| 25230-124* | 15.5 | 21.6 | 0.97 | 0.56 | 0.41 | 0.00 | 0.007 | 0.060 | 0.149 | 0.052 | 0.250 | 0.482 | 9.79 | 0.76 |
| 25230-149** | 14.9 | 20.8 | 1.05 | 0.55 | 0.51 | 0.00 | 0.007 | 0.058 | 0.143 | 0.052 | 0.255 | 0.486 | 9.77 | 0.77 |
| COM1 | 13.9 | 19.5 | 0.63 | 0.39 | 0.24 | 0.00 | 0.009 | 0.051 | 0.135 | 0.045 | 0.238 | 0.522 | 9.81 | 0.84 |

*Average of two NMR tests
*Average of four NMR tests

As it is demonstrated in Table 3, both the comparative and the inventive products contain randomly distributed ethylene in the polymer chains: the Cluster Indices are essentially equal to 10 and the $R_E \cdot R_P$ products are near 1.0. Unexpectedly, however, the total regio defects in the contiguous propylene sequences in the polymer chains are substantially different, namely, the total regio defects in the ethylene-propylene random copolymers made by the inventive processes disclosed herein are 54% and 67% higher for the 25230-124 and 25230-149 samples, respectively, than that in the comparative product (COM1) made by the solution process with the same ethylene content and MFR.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A continuous process to produce ethylene-propylene random copolymers comprising:
   (a) providing a reactor train including one reactor or two or more serially configured reactors;
   (b) contacting in the reactors of the reactor train 1) propylene monomer, 2) one or more catalyst systems, 3) ethylene comonomer, and 4) optional one or more solvents,
   wherein the reactor train is at a temperature of between 65 degrees C. and 180 degrees C. and at a pressure no lower than 10 MPa below the cloud point pressure of the polymerization system and less than 1500 MPa,
   wherein the polymerization system for the reactor train is in its dense fluid state and comprises the propylene monomer, the ethylene comonomer, any solvent present, and the polymer product,
   wherein the one or more catalyst systems for the reactor train comprise one or more catalyst precursors, one or more activators, and optionally, one or more catalyst supports,
   wherein the one or more catalyst systems are chosen from Ziegler-Natta catalysts, metallocene catalysts, nonmetallocene metal-centered, heteroaryl ligand catalysts, late transition metal catalysts, and combinations thereof,
   wherein the polymerization system comprises less than 40 wt % of the optional solvent; and
   (c) forming a polymer reactor effluent including a homogeneous fluid phase polymer-monomer mixture in the reactor train; and
   wherein the resultant copolymer product comprises between 10 wt % and 20 wt randomly distributed ethylene with a melt flow rate of between 0.5 and 20,000 g/10 min,
   wherein the total regio defects of the copolymer in its continuous propylene segments is between 40 and 150% greater than a copolymer of equivalent melt flow rate and wt % ethylene polymerized by a solution polymerization process, and
   wherein the total regio defects in its continuous propylene segments is greater than 0.50 mol %.

2. The process of claim 1 wherein the reactor train is above the critical or pseudo-critical temperature and critical or pseudo-critical pressure of the polymerization system.

3. The process of claim 1 wherein the reactor train is at a temperature of between 65 and 140 degrees C.

4. The process of claim 1 wherein the reactor train is at a pressure of between 13.8 and 137.9 MPa.

5. The process of claim 1 wherein the polymerization system comprises less than 20 wt % of the optional solvent.

6. The process of claim 1 wherein the polymerization system comprises less than 1 wt % of the optional solvent.

7. The process of claim 1 wherein the combined propylene monomer and ethylene comonomer are present in a combined feed to the reactor train at 40 wt % or more.

8. The process of claim 1 wherein the combined propylene monomer and ethylene comonomer are present in a combined feed to the reactor train at 75 wt % or more.

9. The process of claim 1 wherein the combined propylene monomer and ethylene comonomer concentration in the reactor train is greater than 3.0 mol/L.

10. The process of claim 1 wherein the combined propylene monomer and ethylene comonomer concentration in the reactor train is greater than 10.0 mol/L.

11. The process of claim 1 wherein the one reactor or the two or more serially configured reactors are chosen from tank, loop, tubular and combinations thereof.

12. The process of claim 11 wherein the two or more serially configured reactors comprise a tubular reactor followed by a continuous stirred tank reactor.

13. The process of claim 11 wherein the two or more serially configured reactors comprise a tubular reactor followed by a loop reactor.

14. The process of claim 1 wherein the residence time in each reactor of the reactor train is less than 20 minutes.

15. The process of claim 1 wherein the residence time in each reactor of the reactor train is less than 10 minutes.

16. The process of claim 1 wherein the resultant copolymer product has a melt flow rate of between 1.0 and 5,000 g/10 min.

17. The process of claim 1 further including providing one or more additional reactor trains configured in parallel to the reactor train of claim 1, and producing in the one or more additional reactor trains configured in parallel one or more reactor effluents that comprise polymers chosen from ethylene-propylene random copolymers with a different molecular weight or composition, ethylene- or propylene-based polymers other than an EP random copolymer, or a combination thereof 18. The process of claim 17, wherein the reactor effluents from the reactor train and the one or more additional reactor trains configured in parallel to the reactor train of claim 1 are in-line blended to form a polymer product.

19. A random ethylene-propylene copolymer comprising:
between 10 wt % and 20 wt % randomly distributed ethylene with a melt flow rate of between 0.5 and 20,000 g/10 min,
wherein the copolymer is polymerized by a bulk homogeneous polymerization process, and
wherein the total regio defects of the copolymer in its continuous propylene segments is between 40 and 150% greater than a copolymer of equivalent melt flow rate and wt % ethylene polymerized by a solution polymerization process, and
wherein the total regio defects in its continuous propylene segments is greater than 0.50 mol %,
wherein the bulk homogeneous polymerization process occurs in a reactor train including 1) propylene monomer, 2) one or more catalyst systems, 3) ethylene comonomer, and 4) optional one or more solvents at a temperature of between 65 degrees C. and 180 degrees C. and at a pressure no lower than 10 MPa below the cloud point pressure of the polymerization system and less than 1500 MPa, wherein the polymerization system for the reactor train is in its dense fluid state and comprises the propylene monomer, the ethylene comonomer, any solvent present, and the polymer product, and wherein the polymerization system comprises less than 40 wt % of the optional solvent.

20. The copolymer of claim 19 wherein the total regio defects of the copolymer in its continuous propylene segments is between 40 and 100% greater than a copolymer of equivalent melt flow rate and wt % ethylene polymerized by a solution polymerization process.

21. The copolymer of claim 19 comprising between 10 wt % and 18 wt % randomly distributed ethylene.

22. The copolymer of claim 19 wherein the melt flow rate is between 1.0 and 5,000 g/10 min.

23. The copolymer of claim 19 wherein the total regio defects in its continuous propylene segments is greater than 0.70 mol %.

24. The copolymer of claim 19 wherein the peak melting temperature is between 35° and 80° C.

25. The copolymer of claim 19 wherein the peak melting temperature is between 40° and 70° C.

26. The copolymer of claim 19 further comprising between 0.5 wt % and 50 wt % of randomly distributed butene-1, pentene-1, hexene-1, octene-1, decene-1 and/or combinations thereof.

27. The copolymer of claim 19 wherein the one or more catalyst systems for the reactor train comprise one or more catalyst precursors, one or more activators, and optionally, one or more catalyst supports, and
wherein the one or more catalyst systems are chosen from Ziegler-Natta catalysts, metallocene catalysts, nonmetallocene metal-centered, heteroaryl ligand catalysts, late transition metal catalysts, and combinations thereof.

28. The copolymer of claim 19 wherein the polymerization system comprises less than 20 wt % of the optional solvent.

29. The copolymer of claim 19 wherein the polymerization system comprises less than 1 wt % of the optional solvent.

30. The copolymer of claim 19 wherein the reactor train is above its critical or pseudo-critical temperature and critical or pseudo-critical pressure of the polymerization system.

31. The copolymer of claim 19 wherein the reactor train is at a temperature of between 65 and 140 degrees C.

32. The copolymer of claim 19 wherein the reactor train is at a pressure of between 13.8 and 137.9 MPa.

33. The copolymer of claim 19 wherein the reactor train comprises one reactor or the two or more serially configured reactors chosen from tank, loop, tubular and combinations thereof.

* * * * *